INVENTOR.
ROSS M. HEALD

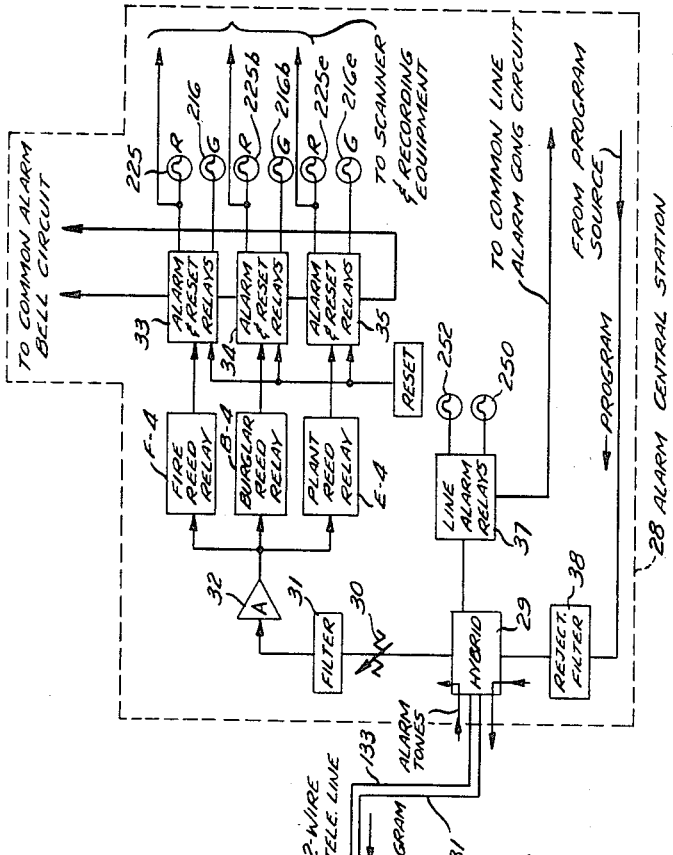
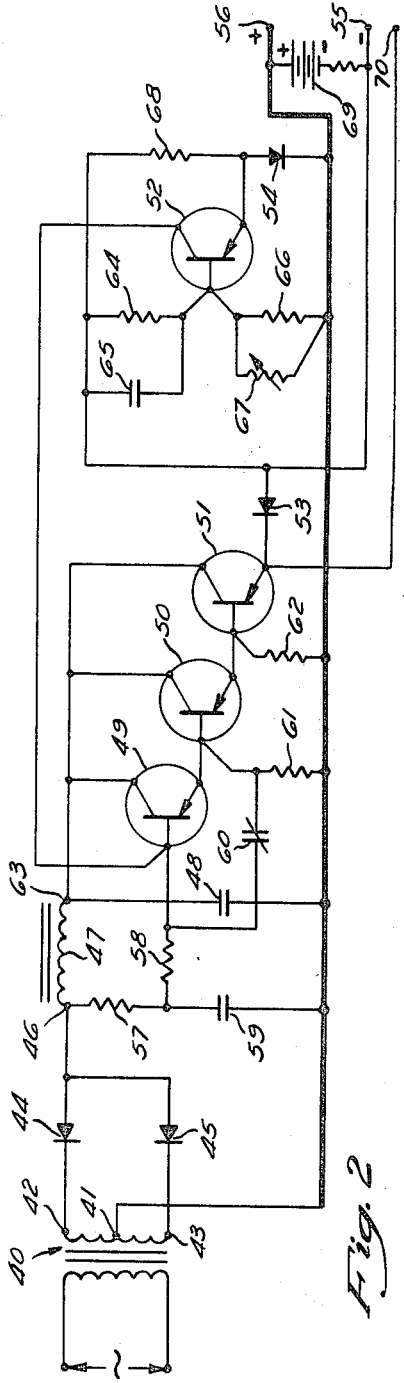
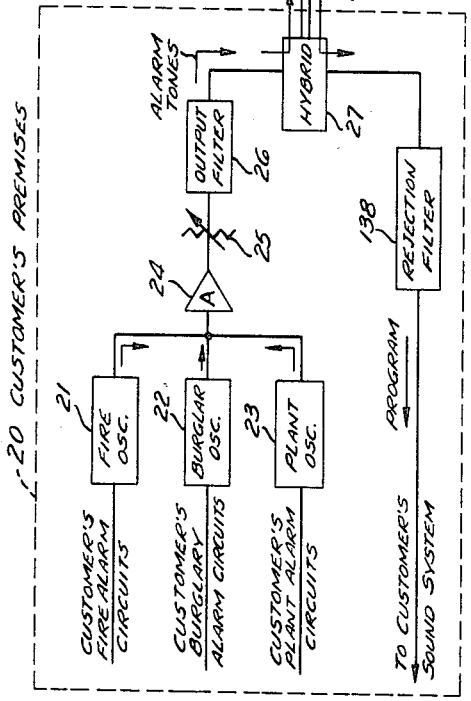
Fig. 1
Fig. 2
INVENTOR.
ROSS M. HEALD
BY
Ely, Golrick & Flynn
ATTORNEYS INVENTOR.
ROSS M. HEALD
BY
Ely, Golrick & Flynn
ATTORNEYS INVENTOR.
ROSS M. HEALD
BY
Ely, Golrick & Flynn
ATTORNEYS

INVENTOR.
ROSS M. HEALD

United States Patent Office 3,401,234
Patented Sept. 10, 1968

3,401,234
COMBINED AUDIO PROGRAM AND ALARM
SIGNALING SYSTEM WITH LINE SUPERVISION
Ross M. Heald, Winnipeg, Manitoba, Canada,
assignor to Rimac, Ltd.
Continuation-in-part of application Ser. No. 246,808,
Dec. 24, 1962. This application Apr. 16, 1965, Ser.
No. 448,695
17 Claims. (Cl. 179—2)

This application is a continuation-in-part of my copending application, Ser. No. 246,808, filed Dec. 24, 1962, and now abandoned.

This invention relates to a signaling system for signaling between a customer's premises and an alarm central station.

In its most complete embodiment the system of the present invention has provision for transmitting alarm signals over a private two-wire telephone line from a customer's premises to an alarm central station and simultaneously transmitting audio program signals, such as music, news or announcements, over the same telephone line from the alarm central station to the customer's premises. However, for situations where the customer is not interested in receiving the audio program signals for broadcast at his premises but is interested in the alarm protection service, the present invention may be embodied in a less complete system in which only the alarm signals are transmitted. Also, in such case the alarm signals may be sent by radio or microwave transmission, if desired. The alarm signals may be for fire, burglary and plant equipment alarms, or any one or more of them.

Considered first in its most complete system aspect, the present invention is particularly advantageous in that it enables only a single two-wire telephone line to transmit both alarm signals and audio program signals simultaneously between the two stations. At each end of the line the alarm signals and the audio program signals are effectively separated from each other, so that at the customer's premises the audio program signals may be broadcast over one or more loud speakers without interference from the alarm signals, while at the alarm central station the incoming alarm signals may be received by alarm detection and recording equipment there without interference from the audio program signals originating there.

Whether by wire or by radio or microwave transmission, the alarm signals preferably are transmitted continuously from the customer's premises to the alarm central station as long as there is no corresponding alarm condition at the customer's premises. A particular alarm signal stops when the corresponding alarm condition occurs. The use of such normally continuous alarm signals is advantageous in that it provides a "fail-safe" system in which an equipment failure can be detected immediately.

Where the signal transmission is over a telephone line, each type of alarm signal (e.g., fire, burglary, and plant equipment) has a distinctive fixed frequency in the low audio range below 2000 cycles per second, preferably between 60 and 240 cycles per second, and ideally between 120 and 180 cycles per second. Because the alarm signals are all within a low audio frequency range, the capacitive losses on the line (which increase directly with the frequency) are sufficiently low as not to constitute a practical limitation on the length of the telephone line, and thus the permissible distance between the alarm central station and the customer's premises, without requiring repeaters on the line. Also, interference or spurious alarm signals due to "cross-fire" or "cross-talk" on the telephone line are effectively eliminated by the use of low audio frequency alarm signals. Each alarm signal has a frequency substantially separated from 60 cycles per second and harmonics thereof, so that signals on nearby power lines cannot produce spurious alarm signals on the telephone line.

At the alarm central station there is an alarm signal receiver for each customer's premises, and each such receiver has a separate alarm signal detector for each type of alarm service for that customer.

In accordance with one aspect of the present invention, a novel visual display arrangement is associated with each alarm signal detector for visually indicating either a no-alarm or an alarm condition at the corresponding customer's premises and also having provision to be set by the alarm central station operator to a standby condition after an alarm condition at the customer's premises has been signaled. This standby condition prevails until the alarm has been answered and the no-alarm signal tone restored.

In accordance with another aspect of the present invention, the alarm signal receiver has an amplifier with a reserve gain greater than the maximum attenuation of the alarm signals which may be caused by a single line fault (i.e., either a ground or an open-circuit condition on either wire of the telephone line). Consequently, the alarm signaling system continues to operate normally in the face of such a line fault.

In accordance with the preferred embodiment of the present invention the provision of several different alarm tone signals over the line from a particular customer's premises to the alarm central station prevents spurious responses by the receiver there. Except in very unlikely circumstances, there will always be at least one alarm signal on the line and this will prevent the amplifier in the receiver from going "wide open" to its maximum possible amplification factor, whereby it might amplify weak spurious signals on the line to a level where they might produce a spurious operation of one of the alarm signal detectors.

Another important aspect of the present invention is directed to a novel line supervision arrangement capable of detecting and indicating to the alarm central station operator a fault on either wire of the telephone line. This line supervision arrangement is able to discriminate between a line fault and any other type of equipment failure in the system.

A principal object of this invention is to provide a novel and improved signaling system for signaling between two stations.

Another object of this invention is to provide such a system in which alarm signaling is performed in a "fail-safe" fashion.

Another object of this invention is to provide such a system having novel provision for distinguishing a true alarm from an apparent alarm caused solely by an equipment failure.

Another object of this invention is to provide such a system having a novel and advantageous alarm-indicating display arrangement at the alarm central station which may be set to a standby condition by the operator there, after an alarm has been received, and which stays in this standby condition until the alarm condition at the customer's premises (the remote station) has been corrected.

Another object of this invention is to provide a novel and advantageous power supply arrangement for the alarm signal transmitter at the customer's premises in such a system which insures that faulty operation of, or tampering with, this power supply will produce an equipment failure alarm and/or burglar indication at the alarm central station.

Another object of this invention is to provide such a system in which a single two-wire telephone line transmits alarm signals from a remote station to a central station while simultaneously audio program signals may be transmitted in the opposite direction over the line from the central station to the remote station for broadcast there.

Another object of this invention is to provide such a system having novel provision for detecting and indicating a fault on the telephone line.

Another object of this invention is to provide such a system which is adapted to maintain operation in the face of a single fault on the telephone line.

Another object of this invention is to provide such a system which has greater freedom from interference by spurious signals, such as power line signals, "cross-talk" and "cross-fire."

Another object of this invention is to provide such a system which enables the use of longer telephone lines between stations without the necessity of providing repeaters on the line.

Another object of this invention is to provide such a system having a novel fixed impedance matching unit at each end of the line to match the particular line to the alarm signal transmitter at the customer's premises and to the alarm signal receiver at the alarm central station.

Another object of this invention is to provide such a system having novel provision for indicating an attack on the line by a would-be burglar or arsonist.

Further objects and advantages of this invention will be apparent from the following detailed description of two presently-preferred embodiments thereof, which are illustrated schematically in the accompanying drawings.

In the drawings:

FIGURE 1 is a schematic block diagram of a preferred first embodiment of the present invention;

FIGURE 2 is a schematic circuit diagram of the power supply for the alarm signal transmitter at the customer's premises in the FIG. 1 system;

FIGURE 12 is a schematic circuit diagram of a voice signaling circuit in this second system for interrupting the normal audio program for announcements or the like.

SYSTEM OF FIGURES 1–8

Figure 3:
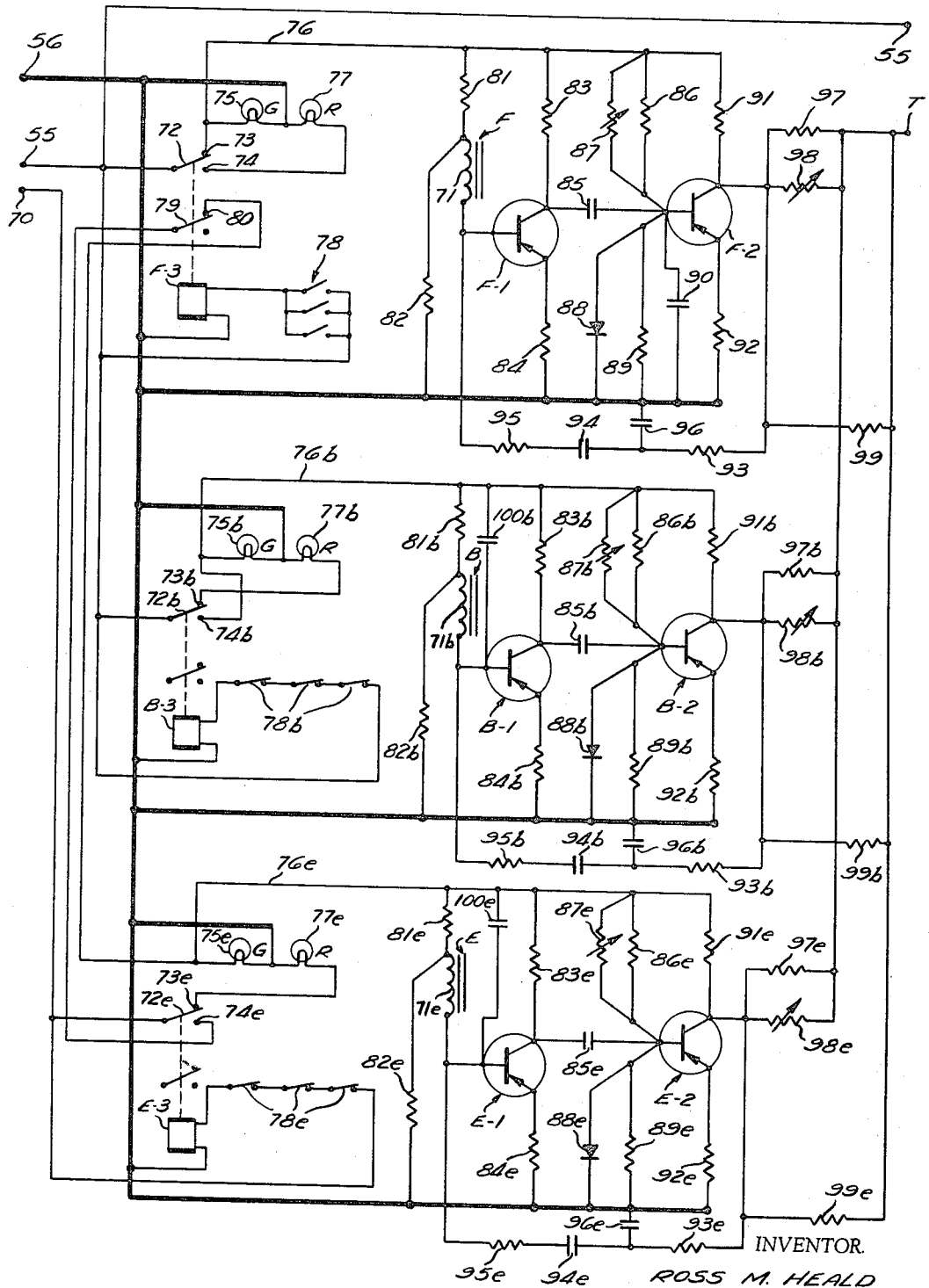
FIGURE 3 is a schematic circuit diagram of the alarm signal oscillators and associated relay circuitry in the transmitter at the customer's premises in the FIG. 1 system.

Referring first to FIG. 1, the preferred form of the present invention shown therein comprises at the customer's premises (within the dashed-line enclosure 20) an alarm tone transmitter including a plurality of alarm signal generators, each having a distinctive, fixed, low audio frequency output tone. In the illustrated embodiment there are a fire alarm signal oscillator 21, a burglar alarm signal oscillator 22, and a plant equipment alarm signal oscillator 23, although it is to be understood that there may be fewer or more of these oscillators, depending upon the types of alarm service required by a particular customer. Each of these oscillators is under the control of various alarm sensing devices corresponding to that particular service. Each oscillator generates its distinctive output signal continuously as long as the corresponding alarm condition has not occured. When the alarm condition occurs, operating the respective sensing device, this turns off the corresponding alarm signal oscillator and the stopping of that alarm tone signals the occurence of that alarm condition.

Either the first alarm oscillator 21 or the burglar alarm oscillator 22, or both, may be interconnected with the plant equipment alarm oscillator 23 so that if the former goes off because of a true alarm condition the plant equipment oscillator also will stop, whereas if the fire alarm oscillator or the burglar alarm oscillator stops because of an internal equipment failure, the plant equipment oscillator will not be turned off. This enables the operator at the alarm central station to distinguish between a true fire or burglar alarm and an apparent fire or burglar alarm due to an equipment failure, as described in detail hereinafter.

The three alarm tones are within the low audio frequency range below 2000 cycles per second, preferably between 60 and 240 cycles per second, and ideally within the range from 120 to 180 cycles per second and substanially separated from either of the latter. In one practical embodiment the alarm tones have frequencies of 140, 150 and 165 cycles per second, respectively. Because the alarm tones are substantially separated from 60 cycles per second and the latter's second and third harmonics, this minimizes interference due to 60 cycles per second power signals on power lines near the telephone line in the present system. Low audio frequency alarm tones are desirable because they enable the use of longer telephone lines between the stations in the system without requiring repeaters on the line to amplify the alarm tones. Also, these low audio frequencies may be separated from the audio program signals coming from the alarm central station without noticeable effect on the listener at the customer's premises.

The three distinct alarm tones from the oscillators 21, 22 and 23 pass through a common amplifier 24 at the customer's premises and then through an attenuating impedance arrangement 25 and an output filter 26 to a hybrid 27 connected to this end of the two-wire telephone line. As described in detail hereinafter, the attenuating impedance arrangement 25 is adjusted to match this telephone line to the alarm tone oscillators.

From the hybrid 27 at the customer's premises the alarm signal tones pass along the two wires 131 and 133 of the telephone line to a receiver at the alarm central station 28. These alarm tone signals are transverse currents on the telephone line passing from the hybrid 27 over one wire of the line to the alarm central station and returning over the other wire of the telephone line, and not relying upon ground for a return path.

At the alarm central station 28 the alarm signal tones pass through a similar hybrid 29, an attenuating impedance 30 (preferably with fixed components), a filter 31 and a common amplifier 32 to three tone detectors. These tone detectors preferably have respective reed relays F–4, B–4 and E–4, respectively, which are tuned precisely to the distinct frequencies of the alarm signal tones, so that each responds only to the corresponding alarm signal tone. These reed relays operate respective alarm and reset relay circuits 33, 34 and 35, which operate alarm signaling arrangements, as described in detail hereinafter.

Each signaling arrangement includes a green lamp 216, 216b or 216e, which is on as long as the corresponding alarm tone is being received (i.e., as long as the corresponding alarm condition has not occurred at the customer's premises). Each alarm signaling arrangement at the alarm central station also includes a red lamp 225, 225b or 225e, which is off as long as the corresponding alarm tone is being received and which comes on when the alarm tone stops.

The alarm signaling arrangement at the alarm central station also includes a bell or other common audible alarm device which operates in response to the stopping of any one of the alarm tones.

Preferably, also, the alarm signaling arrangement at the alarm central station includes a reset arrangement by which the operator there, after an alarm condition has been detected, may turn on the respective green lamp (while the red lamp stays on) to indicate a standby condition, which prevails until the alarm condition at the customer's premises has been corrected. Simultaneously the common audible alarm device is silenced in preparation for receiving the next alarm.

Also, the alarm central station includes recording equipment which automatically records each alarm condition detected there.

In practice, of course, there will be a similar receiver at the alarm central station for each of the other customers serviced by this particular alarm central station. The recording equipment will be connected to all of these receivers, so that one record sheet will contain all of the alarms recorded in a given time period. Also, preferably, a bell or other sounding device will be connected to all of the receivers so as to audibly signal the operator at the alarm central station each time there is any type of alarm condition at any customer's premises.

At the alarm central station 28 there is also an audio program source which usually will be a music program recorded on magnetic tape, with voice announcements or news programs interspersed with the music. The details of this audio program source may be varied for different customer needs and interests, obviously.

This audio program is passed through the rejection filter 38 and the hybrid 29 at the alarm central station and is transmitted as transverse currents over the two-wire telephone line 131, 133 to the customer's premises 20. That is, the audio program signals pass from the alarm central station to the customer's premises over one wire of the line, with the other wire providing the return, just as with the alarm tone signals coming from the customer's premises. The audio program signals and the alarm tone signals may be transmitted in this manner simultaneously over the same telephone line.

At the alarm central station 28 the rejection filter 38 prevents the outgoing audio program signals from passing through the hybrid 29 to the alarm tone receiver circuits.

At the customer's premises 20 the incoming audio program signals pass through the hybrid 27 and through a rejection filter 138 to a sound broadcast system at the customer's premises. The rejection filter 138 prevents the alarm tone signals, which originate at the customer's premises, from passing through the hybrid 27 to the sound broadcast system there.

The customer's premises also preferably is provided with a visual alarm signaling system which signals any alarm conditions occurring there. The alarm signaling system at the customer's premises also preferably includes an audible alarm device or devices for fire and plant equipment alarms.

The central station 28 also has a line supervisory or monitoring arrangement, described in detail hereinafter. This monitoring arrangement includes means for applying a separate supervisory current to each wire of the telephone line, as well as line alarm relays 37 and distinctively colored indicator lamps 250 and 252 which tell whether there is a fault on either wire of the telephone line.

Keeping in mind the general operation of this system, the specific details of its different sections will now be considered.

*Power supply for alarm tone transmitter at customer's premises*

Referring to FIG. 2, the power supply for the alarm tone transmitter at the customer's premises comprises a step-down transformer 40 having its primary winding connected across a suitable 60 cycle per second, 110–120 volt A.C. power supply. A center tap 41 on the secondary winding of this transformer is connected directly to ground. The opposite ends 42 and 43 of this secondary winding are connected through the respective rectifier diodes 44 and 45 to the input terminal 46 of a choke input filter. The D.C. voltage from terminal 46 to ground is 21.5 volts. The choke coil 47 and condenser 48 in the filter smooth the rectified voltage to substantially pure D.C.

Four transistors 49, 50, 51 and 52 and a rectifier diode 53 and a Zener diode 54 are interconnected to regulate the final D.C. output voltage, appearing across the output terminals 55 and 56 of the power supply, at 13.3 volts, regardless of variations in the A.C. line voltage applied to the primary of transformer 40, or the temperature, or the load on the power supply.

Two resistors 57 and 58 are series-connected between the input terminal 46 of the choke filter and the base of transistor 49. A condenser 59 is connected between ground and the juncture of resistors 57 and 58. Another condenser 60 is connected across the base and emitter of transistor 49.

The emitter of transistor 49 is connected directly to the base of transistor 50. A resistor 61 is connected between these electrodes and ground.

The emitter of transistor 50 is connected directly to the base transistor 51. A resistor 62 is connected between these electrodes and ground.

The collector of each transistor 49, 50 and 51 is connected to the juncture 63 of the choke coil 47 and condenser 48 in the choke input filter.

The emitter of transistor 51 is connected directly to the cathode of rectifier diode 53. The anode of this diode is connected directly to the negative output terminal 55 of the power supply.

A resistor 64 and condenser 65 are connected in parallel with each other between the anode of diode 53 and the base of transistor 52. A resistor 66 and an adjustable resistor 67 are connected in parallel with each other between the base of transistor 52 and the positive power supply terminal 56. The collector of transistor 52 is connected directly to the base of transistor 49.

A resistor 68 and the Zener diode 54 are series-connected between the negative and positive output terminals 55 ad 56 of the power supply. The anode of Zener diode 54 is connected directly to the emitter of transistor 52. The Zener diode 54 maintains a constant voltage drop across itself, even in the event of variations in the current through it. Therefore, it maintains the emitter of transistor 52 at a predetermined potential, regardless of any variations in the output voltage across 55 and 56.

If this negative output voltage were to attempt to increase in magnitude for any reason (such as, in response to an increase in the A.C. power supply voltage across the primary of transformer 40, or a temperature change, or a change in the load across output terminals 55 and 56), then the voltage on the base of transistor 52 would increase, thereby increasing the current through transistor 52. This assumed increased current would flow through resistors 57 and 58, decreasing the voltage on the collector of transistor 52, as well as on the base of transistor 49.

Transistor 49 is connected as an emitter follower to transistor 50. Transistor 50 is connected as an emitter follower to transistor 51. Transistor 51 is connected as an emitter follower to rectifier diode 53. Therefore, the assumed reduced voltage on the base of transistor 49 would decrease the voltage on the emitter of transistor 49 and the base of transistor 50, which would decrease the voltage on the emitter of transistor 50 and the base of transistor 51, which would decrease the voltage (negative) on terminal 55, thereby cancelling out the attempt of this voltage to increase.

The reverse would hold true if the negative voltage at 55 were to attempt to decrease in magnitude.

Therefore, the output voltage across terminals 55 and 56 is precisely regulated by this circuit. Preferably, resistor 67 is adjusted to set this output voltage at −13.3 volts.

This power supply also includes a 13.3 volt standby battery 69 connected across output terminals 55 and 56. Normally, no current is drawn from this battery. Only in the event of a failure of the A.C. power supply to transformer 40 would current be drawn from this battery, in order to maintain the alarm tone transmitter operating. Both sides of this battery are floating, i.e., neither is grounded. The positive battery line is shown as a heavy line in FIG. 2.

The function of the rectifier diode 53 is to prevent the voltage of battery 69 from being applied to the emitter of transistor 51 if the A.C. power supply fails. In that event, the voltage at this emitter will drop to zero, thereby creating a plant equipment alarm.

Condenser 60 is adjusted to cause this regulator circuit to oscillate at about 60 kilocycles per second if the standby battery 69 is removed from this circuit, either by tampering or by accident. In such event, 60 kc. signal of two volts peak-to-peak will appear across the power supply output terminals 55 and 56 this creating a burglar alarm, as explained hereinafter.

The emitter of transistor 51 is connected directly to an output line 70 for a purpose explained later.

*Alarm tone generators*

Referring to FIG. 3, the output terminals 55 and 56 and the output line 70 of the just-described power supply are shown at the upper left corner of this figure. This figure also shows the three oscillators or tone generators, one for the fire alarm, the second for the burglary alarm, and the third for the plant equipment alarm. These oscillators generate respective tones of different low audio frequencies, for example, 140, 150 and 165 cycles per second. Each of these oscillators is normally on—that is, it generates its distinctive frequency tone in the absence of an alarm condition. When the alarm condition occurs, then the respective oscillator stops, as explained further hereinafter.

The fire alarm oscillator includes a frequency-sensitive vibratory reed F and two transistors F–1 and F–2. Reed F has a coil 71 whose impedance is very high at the resonant frequency of the reed.

A relay F–3 controls the operation of the fire alarm oscillator. Relay F–3 has a first set of contacts consisting of a mobile contact 72 and spaced fixed contacts 73, 74. Normally (i.e., as long as the coil of relay F–3 is de-energized), contacts 72 and 73 are engaged. Mobile contact 72 is connected to the negative power supply terminal 55. Fixed contact 73 is connected through a green indicator lamp 75 to the positive power supply terminal 56. Contact 73 also is connected directly to a line 76 leading to the reed F and transistors F–1 and F–2.

The other, normally-open fixed contact 74 of this set is connected through a red indicator lamp 77 to the positive power supply terminal 56.

The lower end of the coil of relay F–3 is connected directly to terminal 56. The upper end of this coil is connected through a plurality of parallel-connected, normally-open switches 78 to the negative power supply terminal 55. Each of these switches is arranged to be operated by a fire detection device, such as a smoke detector or temperature-responsive device. While three such switches are shown for purposes of illustration, it is to be understood that there will be as many of such switches and fire detection devices as are necessary to protect the customer's premises.

The relay has a second set of contacts including a mobile contact 79 and an upper fixed contact 80 which is normally engaged by the mobile contact (i.e., when F–3 is de-energized).

Relay F–3 and switches 78 together constitute a fire alarm condition detection means which turns off the fire alarm tone oscillator in response to the occurrence of a fire alarm condition at the customer's premises (which closes one of the switches 78).

With this arrangement, normally (i.e., in the absence of a fire) the switches 78 will all be open, the coil of relay F–3 will be de-energized, relay contacts 72, 73 will be closed, relay contacts 79, 80 will be closed, the green indicator lamp 75 will be on, and the red indicator lamp 77 will be off. When a fire occurs, one or more of the switches 78 will close, thereby completing an energization circuit for the coil of relay F–3. Relay contacts 72, 73 open and the green lamp 75 goes out, relay contacts 72, 74 close and the red lamp 77 goes on to indicate at the customer's premises the fire alarm condition, and relay contacts 79, 80 open.

If desired, a suitable holding circuit (not shown) may be provided to maintain relay F–3 energized independent of the alarm switches 78 after it has been initially energized by the closing of one of these switches.

Transistor F–1 in the fire alarm oscillator has its base connected through the coil 71 of reed F and a resistor 81 to line 76, which extends from relay contact 73. Another resistor 82 is connected between ground and the juncture of resistor 81 and coil 71 of reed F. The collector of transistor F–1 is connected through a resistor 83 to line 76. The emitter of transistor F–1 is connected through a resistor 84 to the positive power supply terminal 56. The collector of transistor F–1 is connected through a condenser 85 to the base of transistor F–2.

A pair of parallel connected resistors 86 and 87 are connected between line 76 and the base of transistor F–2. A rectifier diode 88 is connected between the base of transistor F–2 and the positive power supply terminal 56. A resistor 89 is connected in parallel with this diode, as is a condenser 90. The collector of transistor F–2 is connected through a resistor 91 to line 76. The emitter of transistor F–2 is connected through a resistor 92 to terminal 56.

The collector of transistor F–2 is connected back to the base of transistor F–1 through a positive feedback network including a resistor 93, a condenser 94 and a resistor 95, connected in series between the collector of transistor F–2 and the base of transistor F–1. A condenser 96 is connected between the positive power supply terminal 56 and the juncture between resistor 93 and condenser 94 in the feedback network.

When D.C. power is first supplied to this oscillator, a small random signal occurs at the base of transistor F–1. This random signal is amplified by transistors F–1 and F–2, and is fed back via the feedback network 93, 94, 95, 96 to the base of transistor F–1.

Reed F presents its highest impedance at its own resonant frequency. Therefore, the signal at the base of transistor F-1 will be a maximum at the resonant frequency of reed F. Since there are two stages of amplification, the signal is inverted twice and is fed back in phase to the base of transistor F-1, so that the circuit oscillates. The feedback network F93-96 is so chosen as to insure that the reed F will vibrate at its main or fundamental frequency of resonance, and not at a higher harmonic. The oscillation is quite strong and causes transistor F-2 to be overdriven, producing a square wave output signal at the fundamental resonant frequency of reed F.

The function of diode 88 in the oscillator is to make transistor F-2 overload uniformly on both the positive and negative half cycles of the signal. This prevents the formation of second harmonic signals.

Figure 4:
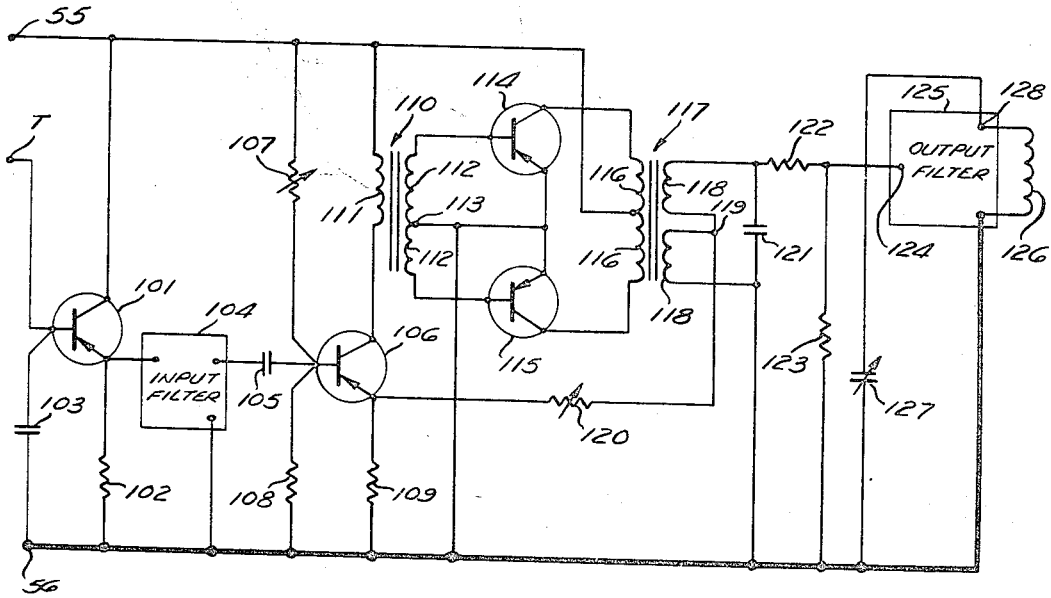
FIGURE 4 is a schematic circuit diagram of the alarm signal amplifier and filters in the transmitter at the customer's premises in the FIG. 1 system.

A pair of resistors 97 and 98, one fixed and one adjustable, are connected in parallel with each other between the collector of transistor F-2 and an output terminal T leading to a common amplifier (FIG. 4). Another resistor 99 is connected between the collector of transistor F-2 and terminal T.

In operation, as long as relay F-3 remains de-energized and the power supply (FIG. 2) provides input power, the fire alarm oscillator will produce square wave oscillations which are applied to terminal T in FIG. 3. However, if one of the fire detecting switches 78 is closed, then relay F-3 will become energized and will disconnect the power supply connection (through its contacts 72, 73 and line 76) for the fire alarm oscillator.

The burglar alarm oscillator in FIG. 3 is basically the same as the fire alarm oscillator and therefore will not be described in detail. Corresponding elements of the burglar alarm oscillator are given the same reference numerals as those in the fire alarm oscillator, with a "b" subscript added. In the burglar alarm oscillator the reed is given the reference character B, the transistors are B-1 and B-2, and the relay is B-3. In the burglar alarm oscillator there is no condenser corresponding to condenser 90 in the fire alarm oscillator. The burglar alarm oscillator has a condenser 100b connected between line 76b and the base of transistor B-1.

The relay circuit in the burglar alarm oscillator is different from that in the fire alarm oscillator in that burglar alarm relay B-3 is arranged to be energized normally (i.e., in the absence of an alam condition) and to become de-energized in response to an alarm condition. The several burglar alarm switches 78b are normally closed and are all connected in series with each other and in series with the coil of relay B-3 across power supply terminals 55 and 56. With relay B-3 normally energized, its contacts 72b, 74b are closed, completing the energization circuit for the green lamp 75b and completing the circuit to line 76b leading to the burglar alarm oscillator.

Relay B-3 and switches 78b together constitute an alarm condition detection means which is operative to turn off the burglar alarm oscillator in response to the occurrence of a burglar alarm condition at the customer's premises (i.e., opening of a switch 78b).

If any one of the burglar alarm switches 78b is opened such as due to intrusion by a burglar, this de-energizes the coil of relay B-3. Relay contacts 72b, 74b open, turning off the green lamp 75b and disconnecting the power supply input to the burglar alarm oscillator, and relay contacts 72b, 73b close to turn on the red lamp 77b.

If desired, a suitable holding circuit may be provided for maintaining B-3 de-energized independent of the alarm switches 78b following its initial de-energization by the opening of one of these switches.

Except for the relay circuit, the burglar alarm oscillator operates in essentially the same manner as the fire alarm oscillator, generating a square wave tone of slightly different frequency which appears at the terminal T except in the event of removal of the battery 69 in the power supply (FIG. 2) or the opening of one or more of the burglar alarm switches 78b.

The plant equipment alarm oscillator in FIG. 3 is basically similar to the fire and police alarm oscillators, corresponding elements being given the same reference numerals with an "e" subscript added. In the plant equipment oscillator, there is no condenser corresponding to condenser 90 in the fire alarm oscillator, and there is a condenser 100e corresponding to condenser 100b in the burglar alarm oscillator.

The relay circuit for this oscillator is similar to that for the burglar alarm relay, except that the coil of relay E-3 is connected to be energized from the output line 70 of the power supply (FIG. 2) through a series of normally-closed plant equipment alarm switches 78e back to the positive power supply terminal 56.

Relay E-3 and switches 78e together constitute a plant equipment alarm condition detection means which will turn off the plant equipment alarm oscillator in response to the occurrence of a plant equipment alarm condition at the customer's premises (i.e., opening of a switch 78e).

The plant equipment alarm oscillator is interlocked with the fire alarm condition detection means as follows:

The lower fixed contact 74e of relay E-3 is connected to mobile contact 79 of relay F-3. Line 76e and the corresponding side of the green indicator lamp 75e associated with relay E-3 are connected to fixed contact 80 of relay F-3. As long as contacts 79, 80 are closed (i.e., as long as relay F-3 is energized, which is the non-alarm condition of the fire alarm oscillator), they complete an energization circuit for lamp 75e and for line 76e of the plant equipment alarm oscillator.

Normally, therefore, in the plant equipment oscillator circuit relay E-3 is energized through the normally-closed alarm switches 78e, and the green lamp 75e and line 76e are energized from line 70 through the now-closed E-3 relay contacts 72e and 74e, and contacts 79 and 80 of relay F-3. Consequently, the plant equipment oscillator is energized. Also, the red indicator lamp 77e is off because contacts 72e and 73e are open. The distinctive frequency tones generated by the plant equipment oscillator pass to the output terminal T which is common to all three oscillators.

Opening of any one of the alarm switches 78e will de-energize the coil of relay E-3, de-energizing the plant equipment oscillator and also turning off the green lamp 75e and turning on the red lamp 77e.

Also, if the voltage at the emitter of transistor 51 in the power supply (FIG. 2) drops to zero, as in the case of a failure of the A.C. power input to transformer 40 or a failure of the power supply, relay E-3 will become de-energized, green lamp 75e will go out, and the power supply to the plant equipment oscillator will be interrupted. Under these conditions, the fire and burglar alarm oscillators will continue to generate tones because battery 69 in the power supply will provide them with input power. Therefore, such a power failure is sensed as a plant equipment failure or alarm condition.

If the battery 69 in the power supply (FIG. 2) is removed or disconnected, the 60 kc. oscillations generated by the power supply, as already described, will be applied by way of line 70 and condenser 100e in the plant equipment alarm oscillator to the base of transistor E-1 in the latter, causing the plant equipment oscillator to cease oscillating and thereby producing a plant equipment alarm (no plant equipment alarm tone) condition at terminal T.

Also, these 60 kc. oscillations are applied by way of power supply terminal 55 and condenser 100b in the burglar alarm oscillator to the base of transistor B-1 in the latter causing the burglar alarm oscillator to cease oscillating. Therefore, if an intruder were to tamper with the battery connections in the oscillator power supply, the burglar alarm oscillator would stop, thereby indicating an alarm condition.

In the fire alarm oscillator, condenser 90 prevents these 60 kc. oscillations in the power supply from turning off the fire alarm oscillator. Therefore, the disconnection of battery 69 in the oscillator power supply, which would rarely, if ever, be due to a fire, does not turn off the fire alarm oscillator.

Due to the described interlock between the fire alarm circuit and the plant equipment alarm circuit, an alarm condition in the fire alarm circuit will also turn off the plant equipment oscillator, as well as the green lamp 75e in the plant equipment alarm circuit as follows:

The fire alarm condition will energize the coil of relay F–3, as described, causing its contacts 79 and 80 to open. This breaks the energization circuit for line 76e leading to the plant equipment oscillator and for green lamp 75e. Therefore, even though the plant equipment alarm switches 78e are closed and the coil of relay E–3 is energized, the plant equipment oscillator and the green lamp 75e will go off. (The red lamp 77e at the plant equipment oscillator will remain off, also, as long as the coil of E–3 remains energized.)

The purpose of this interlock is to introduce deliberately a redundancy into the system ot facilitate discrimination between a true fire alarm and an apparent fire alarm caused simply by an equipment failure. A true fire alarm condition will turn off both the fire alarm and plant equipment alarm oscillators, and this fact will be detected at the alarm central station. On the other hand, an equipment failure in the fire alarm circuit which would turn off the fire alarm oscillator, but not the plant equipment alarm oscillator, will be detected at the alarm central station as a fire alarm unaccompanied by a plant equipment alarm, and this will be treated by the operator there as an equipment alarm rather than a true fire larm.

A similar redundancy interlock may be provided between the burglar alarm circuit and the plant equipment alarm circuit to enable the operator at the alarm central station to differentiate between a true burglar alarm and an equipment failure in the burglar alarm circuit.

Resistors 98, 98b and 98e in the outputs of the respective oscillators are adjusted to equalize the amplitudes of the fire, burglar and plant equipment alarm tones at terminal T.

Each of the relays F–3 and E–3 associated with the fire and plant equipment alarm oscillators, respectively, may operate audible alarm devices (not shown) at the customer's premises, in addition to operating the red and green indicator lamps as described. In the case of the burglar alarm, however, normally it would not be desirable to provide such an audible alarm indication at the customer's premises because this would notify the burglar that his intrusion had been detected.

*Common amplifier for alarm tone generators*

Referring to FIG. 4, the amplifier shown therein amplifies the distinctive frequency tones generated respectively by the fire alarm oscillator, the burglar alarm oscillator and the plant equipment oscillator in FIG. 3.

This amplifier has a transistor 101 having its base connected directly to the output terminal T which is common to all three oscillators, its collector connected to the negative power supply terminal line 55, and its emitter connected through resistor 102 to the positive power supply terminal 56. Transistor 101 operates as an emitter follower. A condenser 103, connected between terminal 56 and the base of transistor 101, attenuates the harmonics of the square wave tones from the oscillators.

From transistor 101 the alarm tones pass through an input filter 104, which further attenuates the harmonics, and through a condenser 105 to the base of a second transistor 106. An adjustable resistor 107 is connected between terminal 55 and the base of this transistor, and a resistor 108 is connected between this base and terminal 56. A resistor 109 is connected between the emitter of transistor 106 and terminal 56.

A driver transformer 110 has its primary winding 111 connected between terminal 55 and the collector of transistor 106. The secondary winding 112 of this transformer has a center tap 113 connected to terminal 56. A pair of transistors 114 and 115 are connected in push-pull relationship across the transformer secondary 112, with the base of transistor 114 connected to one end of the transformer secondary, the base of transistor 115 connected to its opposite end, and the emitters of both transistors 114 and 115 connected to a center tap 113 on the transformer secondary, which is connected directly to the positive power supply terminal 56. The respective collectors of transistors 114 and 115 are connected to the opposite ends of the primary winding 116 of an output transformer 117. Input transformer 110 matches transistor 106 to the bases of the pushpull transistors 114 and 115. Transistors 114 and 115 operate as class B power transistors, each conducting on only its half cycle. The alarm tones are amplified by this push-pull stage and are applied to the output transformer 117.

The secondary winding 118 of output transformer 117 has a center tap 119 which is connected via an adjustable resistor 120 to the emitter of transistor 106. This provides negative feedback to transistor 106, and resistor 120 is adjusted to provide the desired overall amplifier gain.

A condenser 121 is connected across the secondary winding 118 of the output transformer 117 to insure the stability of the amplifier.

The alarm tones then pass through a voltage divider 122, 123 to the input terminal 124 of an output filter 125. This filter is a two-stage filter having a pass band of 130 to 170 cycles per second. All harmonics in the alarm tones are removed in this filter. The alarm tones coming out of filter 125 are applied across a winding 126 of a hybrid at the customer's premises which couples the equipment there to the two-wire telephone line extending between the customer's premises and the alarm central station.

An adjustable condenser 127 is connected between the output terminal 128 of the output filter and the positive power supply terminal 56. This condenser is adjusted to present the correct impedance from the telephone line to the output filter 125.

The voltage-dividing resistors 122, 123 constitute an attenuator and matching circuit, which preferably is positioned in a matching plug at the alarm tone transmitter. The values of these components are chosen so as to match the combined overall impedance and line characteristics of that plug and the particular two-wire telephone line (between the transmitter and the alarm central station) to the transmitter, so as to provide proper level in the transfer of the alarm tones from the transmitter to that particular line, thus providing interchangeability of transmitters without line adjustments.

*Hybrid and rejection filter at customer's premises*

Figure 5:
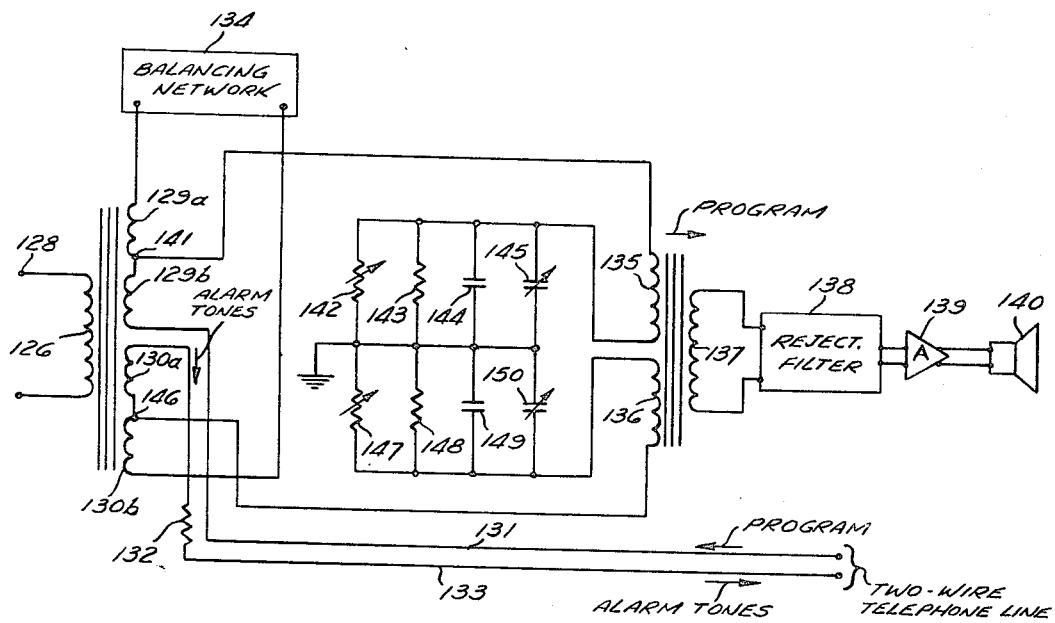
FIGURE 5 is a schematic circuit diagram of the hybrid and the audio program receiver at the customer's premises in the FIG. 1 system.

Referring to FIG. 5, the hybrid at the customer's premises comprises a first pair of identical, series-connected windings 129a and 129b and a second pair of identical, series-connected windings 130a and 130b, all inductively coupled to the aforementioned winding 126. The lower end of winding 129b is connected directly to one wire 131 of the two-wire telephone line which extends between the customer's premises and the alarm central station. The upper end of winding 130a is connected through a resistor 132 to the other wire 133 of this two-wire telephone line.

A balancing network 134, preferably composed of resistors and condensers, is connected between the upper end of winding 129a and the lower end of winding 130b. Network 134 presents an impedance which is substantially matched to the impedance of the two-wire telephone line at the frequency of each of the three alarm tones.

The hybrid also includes a pair of windings 135 and 136, both inductively coupled to a winding 137. The latter is connected through a rejection filter 138 and an amplifier 139 to one or more loud speakers 140, which broadcast at the customer's premises the music or other programs coming over the two-wire telephone line 131, 133 from the alarm central station. The rejection filter 138 rejects all signals within the narrow frequency band occupied by the alarm tones, so that any alarm tone signals which may happen to pass through the hybrid to winding 137 are positively prevented from passing to the loudspeakers 140 at the customer's premises. Except for this relatively narrow bandwidth, which is chosen to be hardly noticeable by program listeners at the customer's premises, the program signals pass to the loudspeakers 140.

The hybrid also operates to separate the program signals from the alarm tone signals at the customer's station, as explained hereinafter.

The upper end of winding 135 is connected directly to a center tap 141 between windings 129a and 129b. The lower end of winding 135 is connected to ground through parallel-connected resistors 142, 143 and condensers 144, 145. Resistor 142 and condenser 145 are adjustable. Condensers 144 and 145 effectively short-circuit the lower end of winding 135 to ground for A.C. Resistors 142 and 143 complete a path to ground for D.C. supervisory current on wire 131 of the telephone line, as explained hereinafter.

Similarly, the lower end of winding 136 is connected directly to a center tap 146 between windings 130a and 130b. The upper end of winding 136 is connected to ground through parallel-connected resistors 147, 148 and condensers 149, 150. Resistor 147 and condenser 150 are adjustable. Condensers 149 and 150 effectively short-circuit the upper end of winding 136 to ground for A.C. Resistors 147 and 148 complete a path to ground for D.C. supervisory current on wire 133 of the two-wire telephone line, as explained hereinafter.

This hybrid is basically a bridge which separates the three alarm from the program coming in over the telephone line. The alarm tones are substantially completely suppressed in going from the input winding 126 to the output winding 137 of the hybrid, but they are passed without excessive attenuation to the two-wire telephone line 131, 133. The program signals coming in over the telephone line pass without excessive attenuation through the hybrid to the output winding 137 and thence to the loud speakers 140.

Considering the alarm signals only, each alarm tone on winding 126 induces first and second secondary currents in windings 129a and 129b, respectively, which are equal if network 134 properly matches the telephone line impedance at this signal frequency. The "first" secondary current (in winding 129a) flows from mid-tap 141 through winding 129a, balancing network 134, winding 130b, and from mid-tap 146 through windings 136 and 135 (which are effectively in series to A.C.) back to mid-tap 141. The "second" secondary current (in winding 129b) flows from mid-tap 141 through windings 135 and 136, winding 130a, through the impedance of the telephone line 133, 131, and from there through winding 129b back to mid-tap 141. These two secondary currents are equal and opposite through windings 135 and 136. Therefore, they produce no net voltage across windings 135 and 136, and they induce no net voltage across winding 137. Consequently, the alarm tone is not applied to the loudspeakers 140 at the customer's premises. The "second" secondary current (in winding 129b) goes to the telephone line, as described, to produce the alarm tones at the alarm central station (at the other end of the line).

In practice, the energy loss of the alarm tones in this hybrid in passing from the alarm tone transmitter to the telephone line is only about 3 decibels.

Considering the program signals only, these signals may be assumed to come in over wire 131 of the telephone line to winding 129b and to return to the other wire 133 of the telephone line from winding 130a. If the impedance across winding 126 looking to the left in FIG. 5 (i.e., toward the alarm tone transmitter) substantially matches the impedance of the telephone line for a given program signal frequency, then this program signal will flow through winding 129b, mid-tap 141, windings 135 and 136 (which are effectively in series to A.C.), mid-tap 146 and winding 130a back to wire 133 of the telephone line without being attenuated significantly. For certain frequencies of the program signals, however, this substantial impedance match will not exist, and in that case the incoming program signal will divide at mid-tap 141, with part going to windings 135, 136 and the remainder going through network 134. However, in either case the incoming program signals produce a substantial current through windings 135, 136, which induces a voltage across secondary winding 137 so that the program signals are broadcast at the loud speakers 140 at the customer's premises.

In practice, it has been found that the attenuation of the program signals in the present system is substantially independent of the impedance of the alarm tone transmitter connected across winding 126.

*Hybrid at alarm central station*

Figure 6:
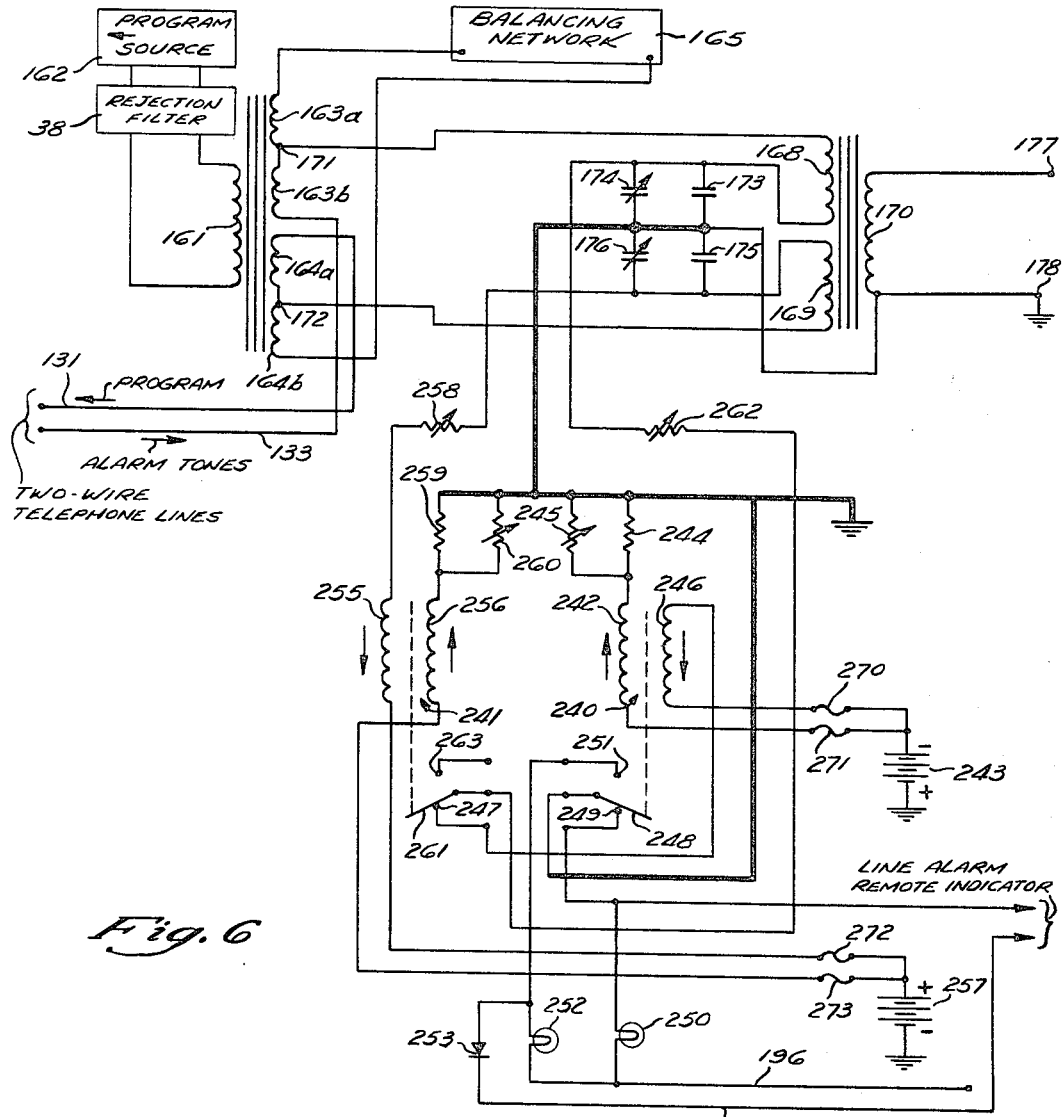
FIGURE 6 is a schematic circuit diagram of the hybrid and the line fault detection circuitry at the alarm central station in the FIG. 1 system.

Referring to FIG. 6, at the alarm central station the alarm tones coming from the customer's premises over the two wire telephone line are passed through a hybrid which is generally similar to the hybrid (FIG. 5) at the customer's station. This hybrid at the alarm central station passes the incoming alarm tones without excessive attenuation to an alarm signaling circuit there. Also, this hybrid passes the program originating at the alarm central station to the two-wire telephone line without excessive attenuation. Rejection filter 38 prevents the program from passing to the alarm signaling circuit at the alarm central station.

This hybrid comprises a winding 161 connected across the program source 162, which broadcasts a program of music and/or voice messages, such as announcements or news. A first pair of windings 163a, 163b and a second pair of windings 164a, 164b are inductively coupled to winding 161. The lower end of winding 163b is connected directly to one wire 133 of the two-wire telephone line. The upper end of winding 164a is connected directly to the other wire 131 of the telephone line. The upper end of winding 163a and the lower end of winding 164b are connected to the opposite terminals of an impedance matching network 165.

The hybrid also includes a pair of primary windings 168 and 169 and a secondary winding 170, which is inductively coupled to both primary windings 168, 169 and is connected to an alarm signaling circuit, to be described later. The upper end of winding 168 is connected directly to a mid-tap 171 between windings 163a and 163b. The lower end of the other primary winding 169 is connected directly to a mid-tap 172 between windings 164a and 164b. The lower end of winding 168 is connected through a pair of parallel-connected condensers 173, 174 to ground, condenser 174 being adjustable. The upper end of winding 169 is connected through a pair of parallel-connected condensers 175, 176 to ground, condenser 176 being adjustable. These condensers effectively short-circuit the lower end of winding 168 and the upper end of winding 169 to ground for A.C.

This hybrid also is basically a bridge which separates the three incoming alarm tones from the outgoing program signals. The incoming alarm tones are passed from the telephone line 131, 133 through this hybrid to the output winding 170 without excessive attenuation. At the same time, the program signals from source 162 are passed to the telephone line without excessive attenuation and are more or less completely attenuated in attempting to pass through the hybrid to the output winding 170.

The terminating condensers 173–176 in the hybrid (FIG. 6) at the alarm central station and the terminating condensers 144, 145, 149, 150 in the hybrid (FIG. 5) at the subscriber's station terminate the respective wires of the telephone line to ground for A.C. They are so chosen that substantially the same attenuation of the alarm signals will be produced by either an open-circuit or a ground fault on either wire of the telephone line. This attenuation is more than offset by the reserve gain of the amplifier (FIG. 7) at the alarm central station so as not to interfere with the continued detection of the alarm tones there in the event of such a fault on the telephone line.

*Amplifier and band pass filter at alarm central station*

Figure 7:
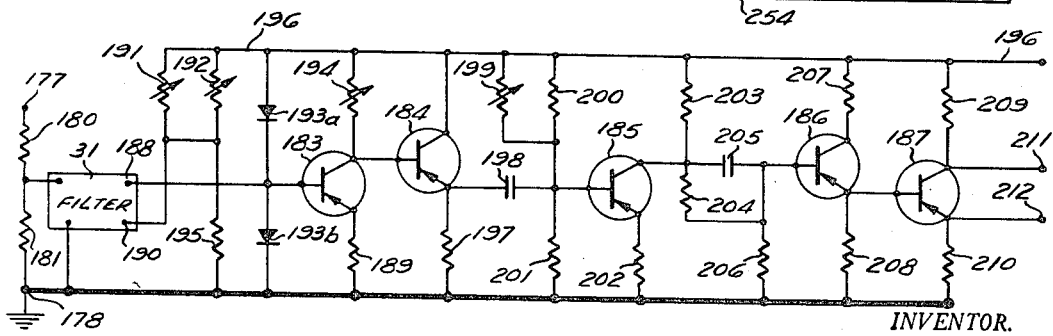
FIGURE 7 is a schematic circuit diagram of the filter and the amplifier in the alarm signal receiver at the alarm central station in the FIG. 1 system.

From the output terminals 177, 178 of winding 170 in FIG. 6, the incoming alarm tones pass to a voltage divider or attenuator composed of resistors 180, 181 (FIG. 7). After being reduced in amplitude in this voltage divider, the alarm tones pass through the band pass filter 31 having a pass band of from 135 to 170 c.p.s. From this filter the three alarm tones pass through an amplifier (32 in FIG. 1) including transistors 183, 184, 185, 186 and 187 in FIG. 6.

Preferably, resistors 180, 181 are fixed resistors in a removable plug at the receiver. They are chosen to match the overall combined impedance of the particular telephone line and this plug to the receiver for maximum transfer of the signal energy between the line and the receiver.

The band pass filter 31 passes the alarm signal tones without substantially attenuation. Thus, this band pass filter helps the separation of the program signals from the alarm tone signals at the alarm central station.

Preferably, as already mentioned, the alarm tone signals are within a frequency range between 120 and 180 cycles per second and substantially spaced from both of these frequencies. The pass band of the band pass filter 31 is within this same frequency range, so that this filter prevents 60 cycle per second power line signals or harmonics thereof from passing to the alarm tone detection circuits.

One output terminal 188 of the band pass filter 31 is connected directly to the base of the first transistor 183. This transistor has a high input impedance due to a large resistor 189 connected between its emitter and ground. The other output terminal 190 of filter 31 is connected through a pair of parallel-connected, adjustable resistors 191 and 192 to a line 196.

A rectifier diode 193a is connected between line 196 and the base of transistor 183. Another rectifier diode 193b of the same polarity is connected between the base of transistor 183 and ground. Normally, diodes 193a and 193b are non-conducting and have no effect on the amplifier. However, in the event of a high transient voltage on the telephone line 131, 133, such as due to a "power hit" or lightning strike, they protect transistor 183 against damage.

A resistor 195 is connected between the output terminal 190 of filter 31 and ground. An adjustable resistor 194 is connected between line 196 and the collector of transistor 183.

The collector of the first transistor 183 is connected directly to the base of the second transistor 184 in this amplifier. The collector of transistor 184 is connected directly to line 196. A resistor 197 is connected between the emitter of transistor 184 and ground. The emitter of the second transistor is coupled to the base of the third transistor 185 through a condenser 198.

A pair of resistors 199 and 200 (199 being adjustable) are connected between line 196 and the base of transistor 185. A resistor 201 is connected between this base and ground. A resistor 202 is connected between the emitter of transistor 185 and ground. A resistor 203 is connected between the collector of transistor 185 and line 196. The collector of the third transistor 185 is coupled through a parallel-connected resistor 204 and condenser 205 to the base of the fourth transistor 186 in the amplifier.

The base of transistor 186 is connected through a resistor 206 to ground. A resistor 207 is connected between line 196 and the collector of transistor 186. A resistor 208 is connected between the emitter of transistor 186 and ground. The emitter of the fourth transistor 186 in this amplifier is connected directly to the base of the fifth transistor 187.

The collector of transistor 187 is connected to line 196 through a resistor 209, and the emitter is connected through a resistor 210 to ground.

The output signals from the amplifier appear across lines 211 and 212, which are connected respectively to the collector and emitter of the fifth transistor 187.

In the operation of this amplifier at the alarm central station, the three incoming alarm tones, after passing through the hybrid of FIG. 6, are amplified by transistors 183–187. Transistors 185, 186 and 187, in addition to amplifying, limit and square off the three tones. The amplitude level of the output from transistor 187 remains substantially constant over a 20 decibel range of the input signals to the amplifier. That is, the amplifier has a reserve gain of 20 db. Consequently, the alarm tone output signals from this amplifier have a substantially constant level or amplitude even in the event of attenuation due to a fault on the telephone line or some other reason.

The three different alarm tone frequencies are unequally spaced. Preferably, one is at 140 c.p.s., a second at 150 c.p.s., and the third at 165 c.p.s. The reason for this is that the receiver amplifier in limiting or clipping these incoming alarm tones also produces sum and difference frequency signals. Therefore if the signals were 140, 150 and 160 c.p.s., for example, and if only the 150 and 160 c.p.s. alarm tones were present on the telephone line, they could combine to produce a spurious 140 c.p.s. signal in the amplifier, so that the alarm central station would not detect the absence of the 140 c.p.s. tone on the line. This is positively avoided by providing unequal frequency spacings between the lower, middle and higher frequency alarm tones.

*Line fault monitoring circuit*

Referring again to FIG. 6, the two-wire telephone line 131, 133 is monitored for faults by a D.C. supervisory circuit connected to the hybrid at the alarm central office. This supervisory circuit includes a pair of two-coil relays 240 and 241.

Relay 240 has a first coil 242 having its lower end connected to the —90 volt negative terminal of a battery 243 through a fuse 271. The upper end of this coil is connected through a pair of parallel-connected resistors 244 and 245 to ground. The positive terminal of battery 243 is grounded. The second coil 246 of relay 240 has its lower end connected to the negative terminal of battery 243 through a fuse 270. The upper end of coil 246 is connected to a normally-closed fixed contact 247 of the other two-coil relay 241.

Relay 240 has a grounded mobile contact 248, a normally-closed fixed contact 249 connected through a green indicator lamp 250 to the aforementioned line 196, and a normally-open fixed contact 251 connected through an amber indicator lamp 252 to line 196. Line 196 is negative with respect to ground. The two coils 242 and 246 of relay 240 are arranged to produce equal and opposite ampere turns of magnetic flux when both are energized by normal current. Resistor 245 is adjustable for this purpose. These coils jointly control the position of mobile contact 249. When both coils 242 and 246 are energized normally, their respective fluxes cancel each other and the mobile contact 248 engages fixed contact 249, as shown in FIG. 6. However, when coil 246 is energized by an abnormally high or low current, as explained hereinafter, the resulting flux unbalance in relay 240 will cause the latter to move the mobile contact 248 out of engagement with fixed contact 249 and into engagement with fixed contact 251.

A diode 253 is connected between the normally-open fixed contact 251 of relay 240 and a line 254 leading to a line alarm indicator device.

The second relay 241 has a pair of coils 255 and 256. The lower end of coil 255 is connected through a fuse 272 to the +90 volt positive terminal of a battery 257, whose negative terminal is grounded. The upper end of coil 255 is connected through an adjustable resistor 258 to the upper end of coil 169 in the hybrid at the alarm central office. The other coil 256 of relay 241 has its lower end connected through a fuse 273 to the positive terminal of battery 257 and its upper end connected to ground through a pair of parallel-connected resistors 259 and 260, resistor 260 being adjustable.

Relay 241 has the already mentioned normally-closed fixed contact 247, a mobile contact 261 connected through an adjustable resistor 262 to the lower end of coil 168 in the hybrid at the alarm central office, and an open-circuited, normally-open fixed contact 263.

The two coils 255 and 256 of relay 241 are arranged to produced equal and opposite fluxes when both are energized by normal current. Resistor 260 is adjusted to provide this equalization. These coils 255 and 256 jointly control the position of the mobile contact 261. When both are energized normally, mobile contact 261 engages fixed contact 247 as shown. When coil 255 is energized by abnormally high or low current, the resulting flux unbalance in relay 241 causes the latter to move mobile contact 261 into engagement with the other fixed contact 263.

Normally (i.e., in the absence of a line fault), the negative polarity D.C. current from battery 243 flows through coil 246 of relay 240 and thence through the normally-closed contacts 247, 261 of relay 241, resistor 262, and through the windings 168 and 163b in the hybrid at the alarm central station to wire 133 of the two-wire telephone line. At the customer's premises (at the other end of the telephone line) this negative D.C. current flows through windings 130a and 136 in the hybrid there (FIG. 5), and thence through resistors 147, 148 to ground.

The green indicator lamp 250 at the alarm central office is energized from line 196 through relay contacts 249, 248 to ground at this time. The amber indicator lamp 252 is off.

Normally, also, the positive polarity D.C. current flows from battery 257 (FIG. 6) at the alarm central office through coil 255 of relay 241, resistor 258, and through winding 169 and winding 164a in the hybrid at the alarm central office to wire 131 of the two-wire telephone line. At the other end of the line (FIG. 5), this positive D.C. current flows from wire 131 through winding 129b in the hybrid to mid-tap 141 and thence through winding 135 there and thence through parallel-connected resistors 142, 143 to ground.

Under these normal (i.e., no line fault) conditions, the net flux of relay 240 is substantially zero so that its contacts 248, 249 are engaged, and the net flux of relay 241 is substantially zero so that its contacts 261, 247 are engaged.

In the event that the telephone line wire 133 becomes fully or partially open-circuited, the current through coil 246 will decrease and relay 240 will operate due to the flux unbalance at its coils 242 and 246. Relay 240 moves its mobile contact 248 out of engagement with contact 249 and into engagement with contact 251. The opening of contacts 248, 249 causes the green lamp 250 to go off. The closing of contacts 248, 251 causes the amber lamp 252 to go on, this lamp now being energized from line 196 through contacts 251, 248 to ground. The closing of contacts 248, 251 also connects diode 253 to ground and causes the alarm device on line 254 to be operated.

In the event that the telephone line wire 133 becomes fully or partially grounded, the current through coil 246 will increase to an abnormal value and relay 240 will operate due to the flux unbalance between its coils 242 and 246, turning off the green lamp 250, turning on the amber lamp 252 and operating the audible alarm device on line 254 by grounding diode 253.

If either an open-circuit or grounded condition, complete or partial, occurs on the other telephone line wire 131, there will be either a current decrease or increase in coil 255 of relay 241, unbalancing the fluxes in this relay and causing it to open its contacts 261, 247. The opening of these contacts breaks the energization circuit for the coil 246 of relay 240. Consequently, relay 240 operates, turning off the green lamp 250, turning on the amber lamp 252, and operating the audible alarm device on line 254.

When the line fault is corrected, the respective relay 240 or 241 associated with that particular wire of the telephone line automatically is restored to the normal (no line fault) condition by virtue of the fact that the opposing fluxes in its two coils will be equalized.

At the subscriber's station, FIG. 5, the terminating resistors 142, 143 and 147, 148 maintain the respective wires 131 and 133 of the telephone line at D.C. potentials substantially different from ground, so that the existence of leakage or a short circuit to ground of either wire at or near the subscriber's station will be detected by the line fault monitoring circuit of FIG. 6. Because of the terminating condensers 144, 145 and 149, 150, these resistors are not a significant factor in the A.C. circuitry.

Separate fuses 270, 271, 272 and 273 are connected in the respective lines from batteries 243 and 257 to relay windings 246, 242, 256 and 255. Therefore, the line fault alarm will operate in the event of a fault in any of these lines from the respective battery to a relay winding. This insures that the line alarm will be in working order, or else the alarm will operate the same as if a fault had actually occurred in the telephone line.

Since both a positive battery 257 and a negative battery 243 are used to apply separate individual D.C. supervisory currents to the telephone line wires 231 and 233, respectively, the ground is not used and thus no ground currents exist to cause erosion effects.

If both wires of the telephone line are cut or are shorted to each other, this will be detected by the D.C. supervisory circuit just described and also it will stop all of the alarm signal tones on this line, causing all of the red alarm lamps for that customer to light up at the alarm central station where it will be treated as a burglar alarm. Therefore, a deliverate attack on the line by a would-be burglar or arsonist will be detected in a distinctive and unique manner at the alarm central station in that the line supervisory alarm and the burglar, fire and plant equipment alarm lights will all be operated.

*Alarm tone detectors at alarm central station*

Figure 8:
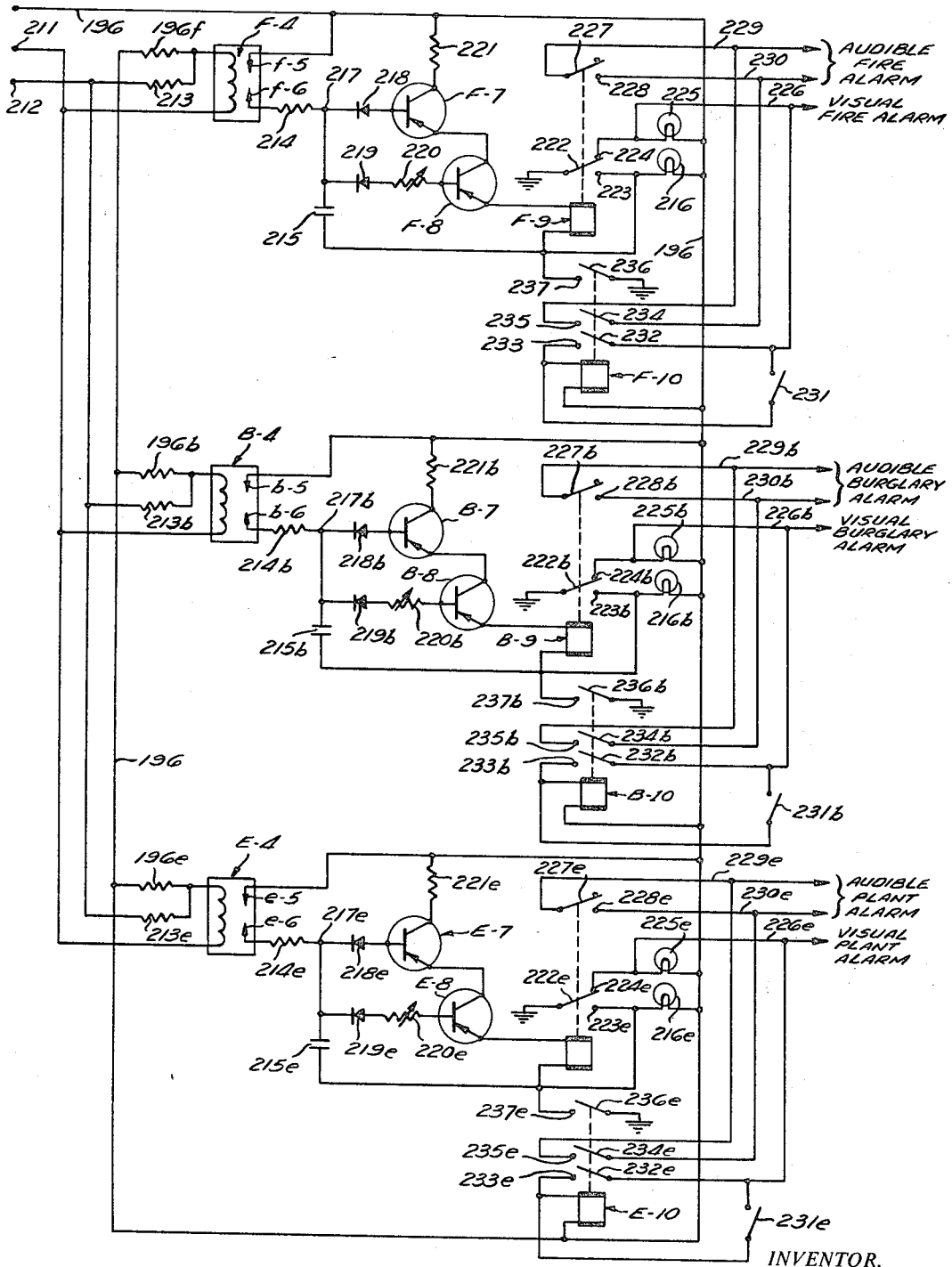
FIGURE 8 is a schematic circuit diagram of the alarm signal detectors and associated signaling circuitry in the receiver at the alarm central station in the FIG. 1 system.

Referring to FIG. 8, the output signals from the amplifier of FIG. 7 are applied via terminals 211 and 212 to three reed relays F-4, B-4 and E-4, respectively. Reed relay F-4 is tuned precisely to the frequency of the fire alarm oscillator tones, and B-4 and E-4 are similarly tuned respectively to the burglary and plant equipment alarm tone signal frequencies. Therefore, these reed relays effectively detect and separate from one another the three different incoming alarm tones.

The lower end of the coil of reed relay F-4 is connected directly to line 211 from the collector of the final transistor 187 in the FIG. 7 amplifier. The upper end of this relay coil is connected through a biasing resistor 213 to the other output line 212 from the amplifier. Also, the upper end of this relay coil is connected through a resistor 196f to the aforementioned line 196.

The respective coils of reed relays B-4 and E-4 have similar connections to the amplifier output, so that the three relays F-4, B-4 and E-4 are effectively in parallel with each other across the amplifier output. The function of the biasing resistors 213, 213b and 213e is simply to reduce the D.C. voltage applied across the respective relay coils to an acceptably low level.

Normally, all three alarm tones (fire, burglary and plant equipment) are received and they keep the respective reed relays F-4, B-4 and E-4 operating continuously. Each reed relay, when so energized, closes its internal contacts f-5 and f-6, b-5 and b-6, or e-5 and e-6 for approximately 20% of each cycle of the respective incoming alarm tone.

Referring to the fire alarm reed relay F-4, its contact f-5 is connected directly to the aforementioned line 196. Under normal conditions its contact f-6 is connected through a series circuit composed of a resistor 214, a condenser 215 and contacts 222, 223 to ground. The contacts f-5 and f-6 of reed relay F-4 charge condenser 215 through resistor 214 so as to maintain a voltage at the junction point 217 between them of substantially −12.8 volts.

A rectifier diode 218 is connected between this junction point 217 and the base of a transistor F-7. A rectifier diode 219 and an adjustable resistor are series-connected between juncture 217 and the base of a second transistor F-8. The collector of transistor F-7 is connected through a resistor 221 to line 196. The emitter of transistor F-7 is connected directly to the collector of transistor F-8. The emitter of transistor F-8 is connected to one terminal of the coil of an alarm relay F-9, the other terminal of this coil being connected to the lower terminal of condenser 215.

With this arrangement, the transistors F-7 and F-8 are connected in series, each as an emitter follower. Normally, both diodes 218 and 219 conduct, passing the −12.8 volt D.C. signal from junction point 217 to the respective transistors F-7 and F-8. Because both transistors F-7 and F-8 are emitter followers, the voltage applied across the coil of relay F-9 is also approximately −12.8 volts, which is effective to operate this relay.

The use of two transistors (F-7 and F-8), where one would have sufficed, through simple redundancy greatly enhances the reliability of this circuit.

Relay F-9 has a first set of contacts composed of a grounded mobile contact 222, a normally-open fixed contact 223 connected through the green lamp 216 to line 196 and also connected to the lower terminal of the coil of this relay, and a normally-closed fixed contact 224 connected through a red indicator lamp 225 to line 196. Contact 224 also is connected directly to a line 226 leading to a visual fire alarm device.

Relay F-9 also has a second set of contacts comprising a mobile contact 227 and a normally-open fixed contact 228, which are respectively connected directly to lines 229 and 230 leading to an audible fire alarm device.

When the coil of relay F-9 is energized as described, the following happens;

(1) The green indicator lamp 216 is energized through relay contacts 222 and 223, and the lower end of relay coil F-9 is grounded through these same contacts;

(2) The red indicator lamp 225 is out because relay contacts 222 and 224 are open, and the visual fire alarm device on line 226 is kept de-energized for the same reason;

(3) The audible fire alarm device is kept de-energized due to relay contacts 227 and 228 being closed.

A reset relay F-10 is associated with the alarm relay F-9. The lower end of the coil of relay F-10 is connected directly to line 196. The upper end of this relay coil is connected through a normally-open reset switch 231 to line 226. Relay F-10 has three sets of contacts. The first set comprises a mobile contact 232 connected directly to line 226 and a normally-open fixed contact 233 connected to the upper end of the coil of relay F-10. The second set comprises a mobile contact 234 connected to line 230 and a normally-open fixed contact 235 connected to line 229. The third set comprises a grounded mobile contact 236 and a normally-open fixed contact 237 connected to the lower end of the coil of relay F-9 and to the line 196 through the green lamp 216.

Normally (i.e., as long as the fire alarm tones are being received at the alarm central station), the reset switch 231 is open, relay F-9 is energized, and relay F-10 is de-energized.

When a fire alarm condition occurs at the customer's premises, this will stop the fire alarm tone, as described. Consequently, relay F-9 will become de-energized, turning off the green lamp 216 and turning on the red lamp 225 and also producing an audible alarm by way of lines 229 and 230 and a visual alarm over line 226 which will be noticed by the operator at the alarm central office. The operator now closes the reset switch 231 momentarily, completing an energization circuit for the coil of the relay F-10 by way of line 196, the coil of relay F-10, reset switch 231, line 226, and the F-9 relay contacts 224 and 222 to ground.

When the reset relay F-10 becomes energized, its contacts 236 and 237 close, connecting the lower end of the coil of alarm relay F-9 to ground so that the latter will be energized when the fire alarm tone reappears. Also, the closing of the F-10 relay contacts 236, 237 turns on the green lamp 216 again. The red lamp 225 remains on as long as relay coil F-9 remains de-energized. This is the stand-by condition, with both the red and green lamps 225 and 216 on.

Also, when the coil of reset relay F-10 is energized, its contacts 234 and 235 close, shorting lines 229 and 230 and thereby de-energizing the bell or other audible alarm device operated by these lines.

Also, when the coil of reset relay F-10 is energized, its contacts 232 and 233 close, completing a holding circuit for maintaining F-10 energized, independent of the reset switch 231, by way of line 196, relay coil F-10, F-10 relay contacts 233 and 232, line 226, and F-9 relay contacts 224 and 222 to ground. Therefore, relay F-10 will remain energized, even after the reset switch 231 is released by the operator and opens again, until relay F-9 becomes energized again.

When the fire alarm condition at the customer's premises has been corrected and the fire alarm tone is restored, this re-energizes the coil of alarm relay F-9 with the following results:

(1) The F-9 relay contacts 222 and 223 close again, breaking the holding circuit for the coil of reset relay F-10 and causing the latter to become de-energized (reset switch 231 being open);

(2) The red lamp 225 goes out and the green lamp 216 stays on, indicating that the fire alarm system has been restored to the no-alarm condition;

(3) The lower end of the coil of alarm relay F-9 is connected to ground through its now-closed contacts 223 and 222 for normal energization of F-9;

(4) The F-9 relay contacts 227 and 228 close to keep the audible fire alarm device connected across lines 229 and 230 from sounding;

(5) The opening of the F-9 relay contacts 224 and 229 turns off the visual fire alarm device connected to line 226.

The reed relay B-4 operated by the incoming burglar alarm tones has an amplifier and alarm relay arrangement which is identical to that described in detail for the fire alarm reed relay F-4. This amplifier and alarm relay arrangement will not be described in detail. Corresponding elements in this arrangement are given the same reference numerals as in the fire alarm circuit, with a "b" subscript added. The transistors in this burglar alarm amplifier are designated B-7 and B-8, respectively, and the relays B-9 and B-10.

The reed relay E-4 operated by the plant equipment alarm tones has an amplifier and alarm relay arrangement which is identical to that for the fire alarm reed relay F-4, also. Corresponding elements in the plant equipment alarm circuit have the same reference numerals as those in the fire alarm circuit, with an "e" subscript added. The transistors in this plant equipment alarm circuit are designated E-7 and E-8, and the relays E-9 and E-10, respectively.

The lines 229, 230 and 229b, 230b and 229e, 230e may all be connected to a gong or other audible alarm device which will operate in response to any of the three types of alarm conditions so as to alert the operator at the alarm central station.

The occurrence of such an alarm condition and its detection at the alarm central station also operate a recording apparatus (not shown), which automatically prints a record identifying the customer's premises where the alarm condition has occurred, the type of alarm, the time of the alarm, and other pertinent information.

From the foregoing detailed description it will be apparent that the specific system of FIGS. 1-8 is particularly well adapted for the accomplishment of all of the stated objects of this invention. However, it is to be understood that various modifications, omissions and refinements which depart from this specific embodiment may be adopted without sacrificing the essential operating characteristics desired. For example, if very high quality rejection filters are used at the opposite ends of the telephone line the hybrids may be omitted as not absolutely necessary to provide the desired separation between the alarm tone signals and the audio program signals.

SYSTEM OF FIGURES 9-13

A second system in accordance with the present invention is illustrated in FIGS. 9-13. This system accomplishes many, but not all, of the stated objects of this invention and therefore is considered less desirable than the system of FIGS. 1-8, although offering numerous significant advantages over prior alarm signaling systems.

Figure 9:
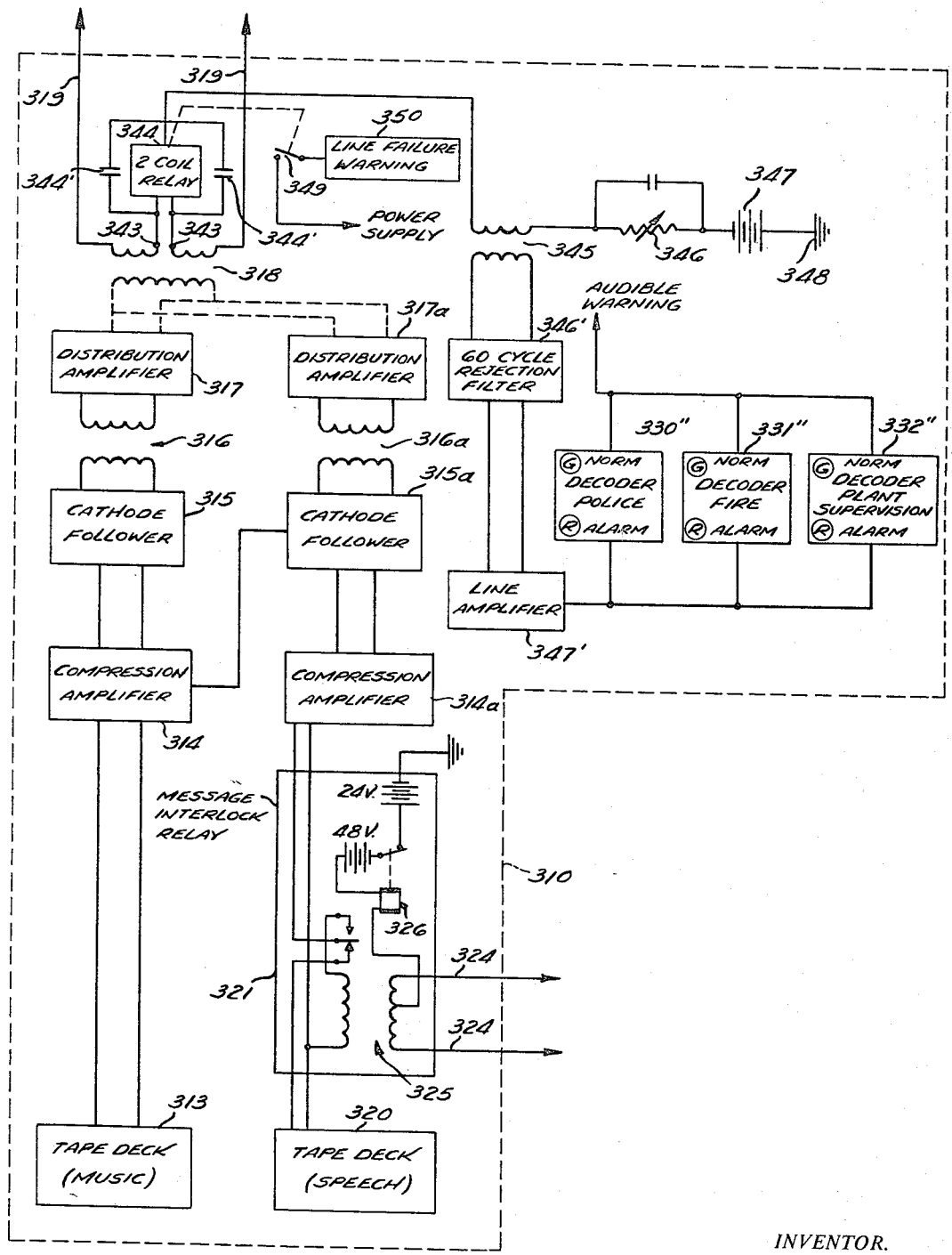
FIGURE 9 is a schematic block diagram of the audio program transmitter and the alarm signal receiver equipment at the alarm central station in a second embodiment of the present system.

Referring to FIGS. 9-13, the portion included within the dashed-line enclosure 310 in FIG. 9 is identified as program and alarm central, the portion enclosed within the dashed-line enclosure 311 (FIG. 12) is at the head office of the store system, or alternatively, the school board offices if the arrangement is incorporated in such a system. The portion enclosed within the dashed-line enclosure 312 (FIG. 13) is the alarm signaling circuitry and the audio program receiving unit at the customer's premises, such as a store or school, and it is to be understood that there may be as many of these units as desired.

Dealing first with a description of the audio program source at the alarm central station (FIG. 9), a tape deck 313 is provided for taped music for distribution to the various program receiver units 312 at the various customers' premises. This audio program material passes through compression amplifier 314, cathode follower 315, line transformer 316 and distribution amplifier 317, all of which are conventional in construction.

Figure 13:
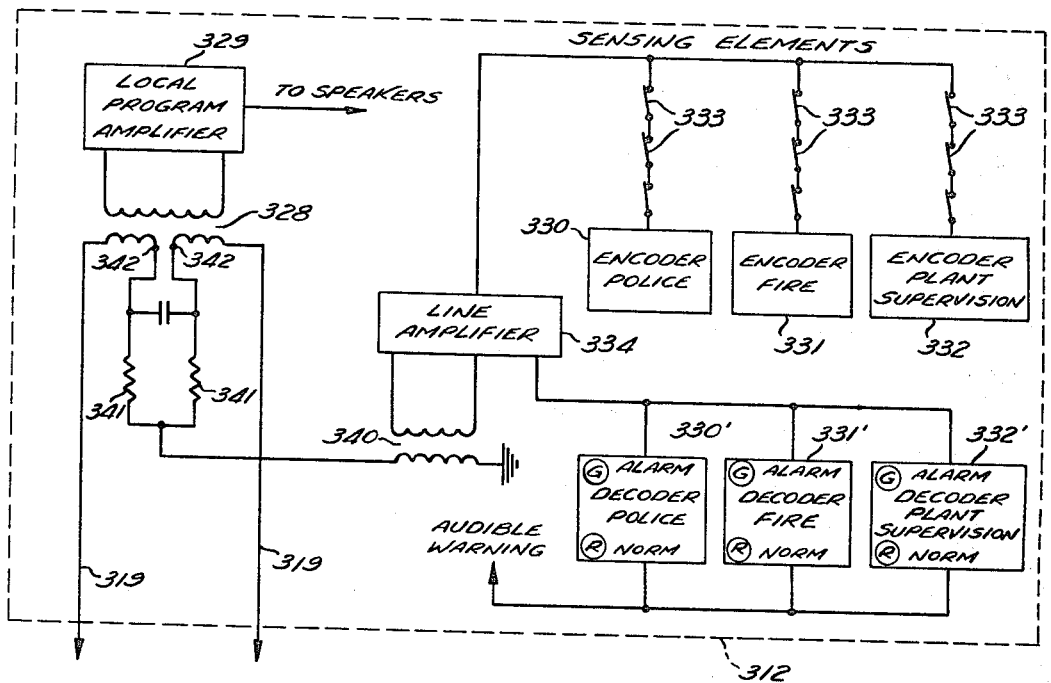
FIGURE 13 is a schematic block diagram of the alarm signaling circuitry and the audio program receiver at the customer's premises in this second system.
Figure 12:
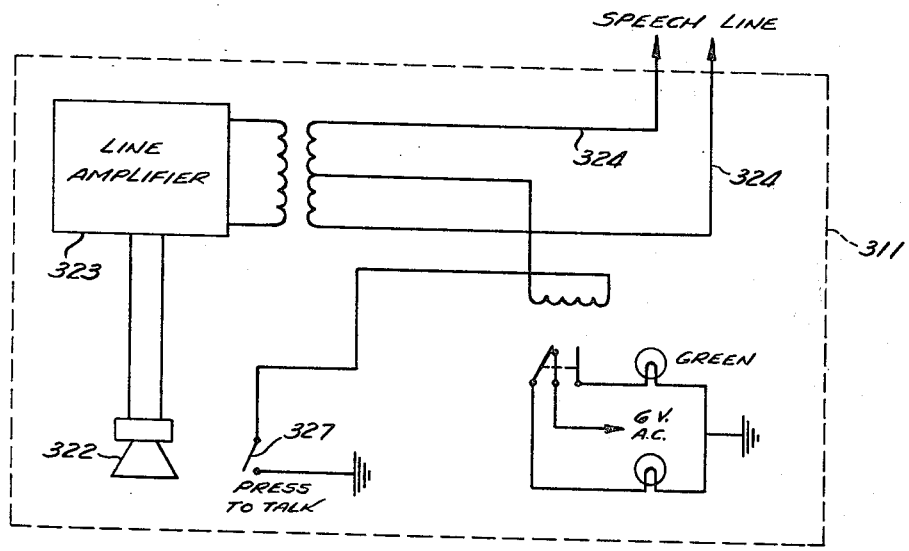

From the distribution amplifier 317, these audio program signals are fed to an output transformer 318 and thence by a private telephone line having just two wires 319, to the program receiver units 312 (FIG. 13).

It is desirable to supply a further tape deck 320 (FIG. 9) upon which taped speech announcements may be recorded, these speech announcements passing through a switching module 321 which will hereinafter be described, through a similar compression amplifier 314a and cathode follower 315a to line transformer 316a and distribution amplifier 317a.

The output from the distribution amplifier 317a is fed also to the output transformer 318, it being understood that, due to the switching module 321, either the music tape deck 313 or the speech tape deck 320 only is in use at one time.

It is, of course, desirable to be able to cut in voice from the head office location 311 (FIG. 12) and in this connection a microphone 322 is utilized together with line amplifier 323, the output being fed through the two wires 324 of a telephone line from the head office (FIG. 12) to the input transformer 325 of the switching module 321 at the alarm and program central station 310 (FIG. 9).

The switching module 321 is used basically to intersperse speech announcements from the tape deck 320 with musical selections from the tape deck 313 and the switching module accomplishes this by sensing the silence period between the musical selections and then, depending upon the settings, cutting in the speech tape deck 320.

As an example, if the integrating control is set at four, then four musical selections will pass and then the music tape deck 313 will stop and the speech tape deck 320 will start.

Reference character 326 in FIG. 9 indicates a message interlock relay which is used to prevent the operation of the microphone 322 so long as the speech tape deck 320 is operating. The voltage of the power supply extends via the telephone line wires 324 back to the head office location 311 (FIG. 12) and is interconnected with the operating control 327 of the microphone 322 there, which prevents it from cutting in as long as a message is emanating from the speech tape deck 320. This is to prevent speech emanating from two sources simultaneously but, of course, the microphone 322 at the head office can be used while the music tape deck 313 is in operation.

Dealing next with the unit 312 (FIG. 13) at the customer's premises, the two wires 319 of the telephone line extending between the program and alarm central station and the customer's premises enter the unit by means of an input transformer 328. The incoming audio program signals pass to the local program amplifier 329 and thence to the various speakers (not indicated) of the sound system at the customer's premises.

Figure 10:
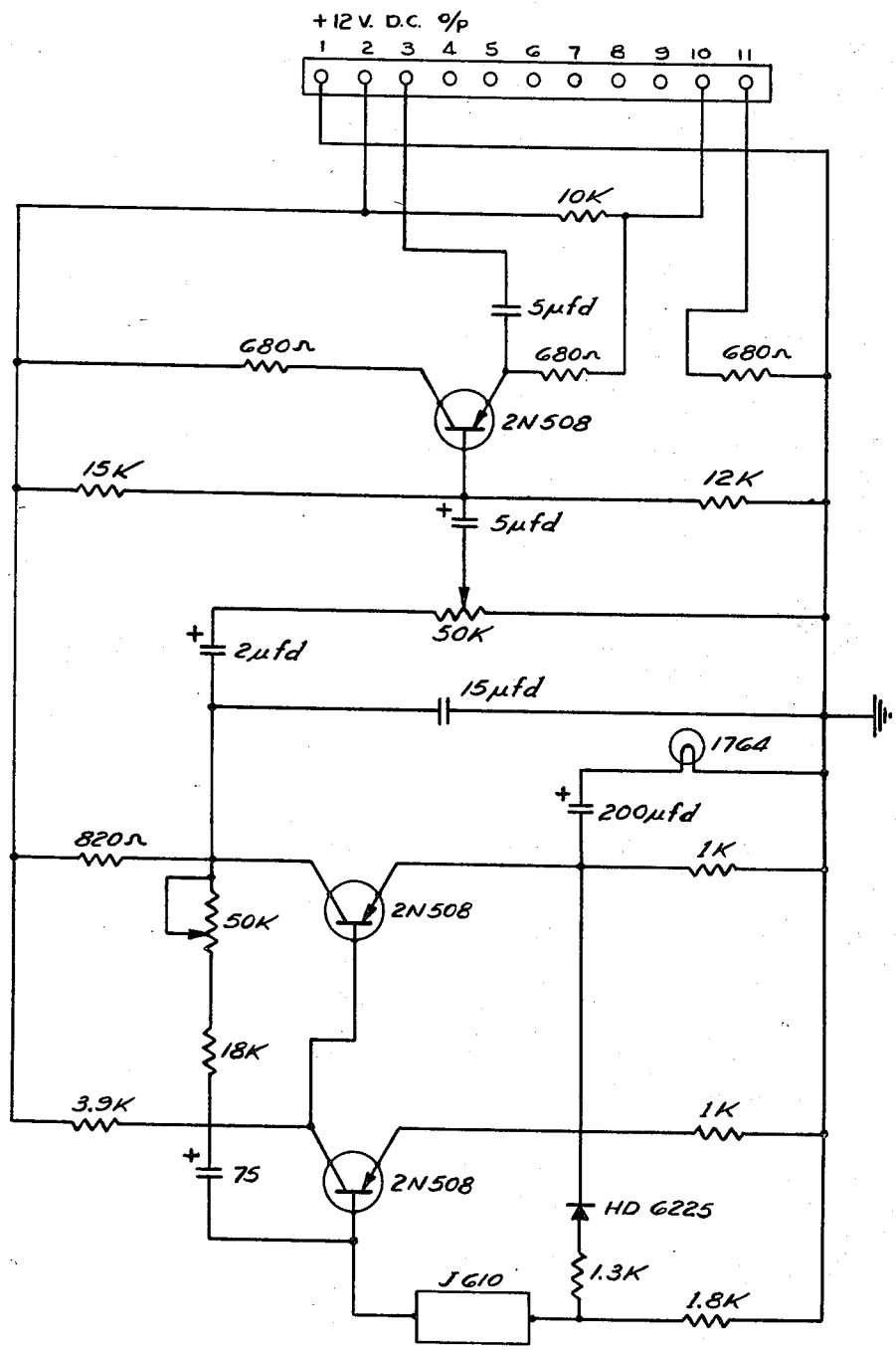
FIGURE 10 is a schematic circuit diagram of one of the alarm signal oscillators at the customer's premises in this second system.

Dealing next with the alarm signaling system at the customer's premises (FIG. 13), reference characters 330, 331 and 332 indicate oscillator encoding modules, the details of which are shown in FIG. 10. These are in effect tone generators, each of which generates a tone at an extremely precise distinctive frequency. Preferably these alarm tones may have closely spaced, separate and distinct frequencies within the frequency range specified in the description of the system of FIGS. 1-8. These alarm tones pass through a line amplifier 334 and thence to corresponding decoder modules 330', 331' and 332' situated in the unit 312 at the customer's premises and corresponding decoder modules 330", 331" and 332" situated in the program and alarm central unit 310 (FIG. 9).

In the specific system shown, three encoders are provided with corresponding decoders but it will be appreciated that any number can be incorporated depending upon the number of different alarm services desired.

The encoder 330 is represented as the police alarm module and may cover the store safe, doors, windows, and other areas desired to be protected against burglary.

The encoder 331 is designated as the fire alarm module and may cover springler operation, smoke sensing devices and other fire detection apparatus.

The plant supervision oscillator 332 is designed to protect such items in supermarkets as cold box thermostats, furnace pilot-off detector, and primary power failure detector.

The above are representative only of the various elements which may be incorporated in series with the encoders and are identified as sensing elements 333 in all cases and it will be noticed that these sensing elements shown are in series with the output to the line amplifier 334 and are illustrated as contacts shown in the closed position, which means that the alarm tones generated by the encoders pass through the sensing elements to the line amplifier and then to the decoders. However, in actual practice a D.C. supervisory current is passed through the sensing element contacts 333, which current in turn controls the tone output of the respective encoder to the line amplifier as shown in FIG. 10.

The tone generators 330, 331 and 332 are each designed to generate a specific frequency alarm signal and the corresponding decoder modules are designed to detect this specific signal frequency, so that the plurality of frequencies emanating from the various encoder modules can pass through the line amplifier 334 and can be detected by the corresponding tuned decoder devices in the unit 312 at the customer's premises and remotely at the alarm central station 310 (FIG. 9).

The various sensing elements 333 hereinbefore described can include such devices as proximity detectors located within the safe but, irrespective of the type of sensing element used, they are all designed to open upon interference, thus causing the corresponding alarm tone to disappear from that particular circuit and this stopping of the alarm tone is immediately detected by the corresponding decoder, so that an alarm is given.

Figure 11:
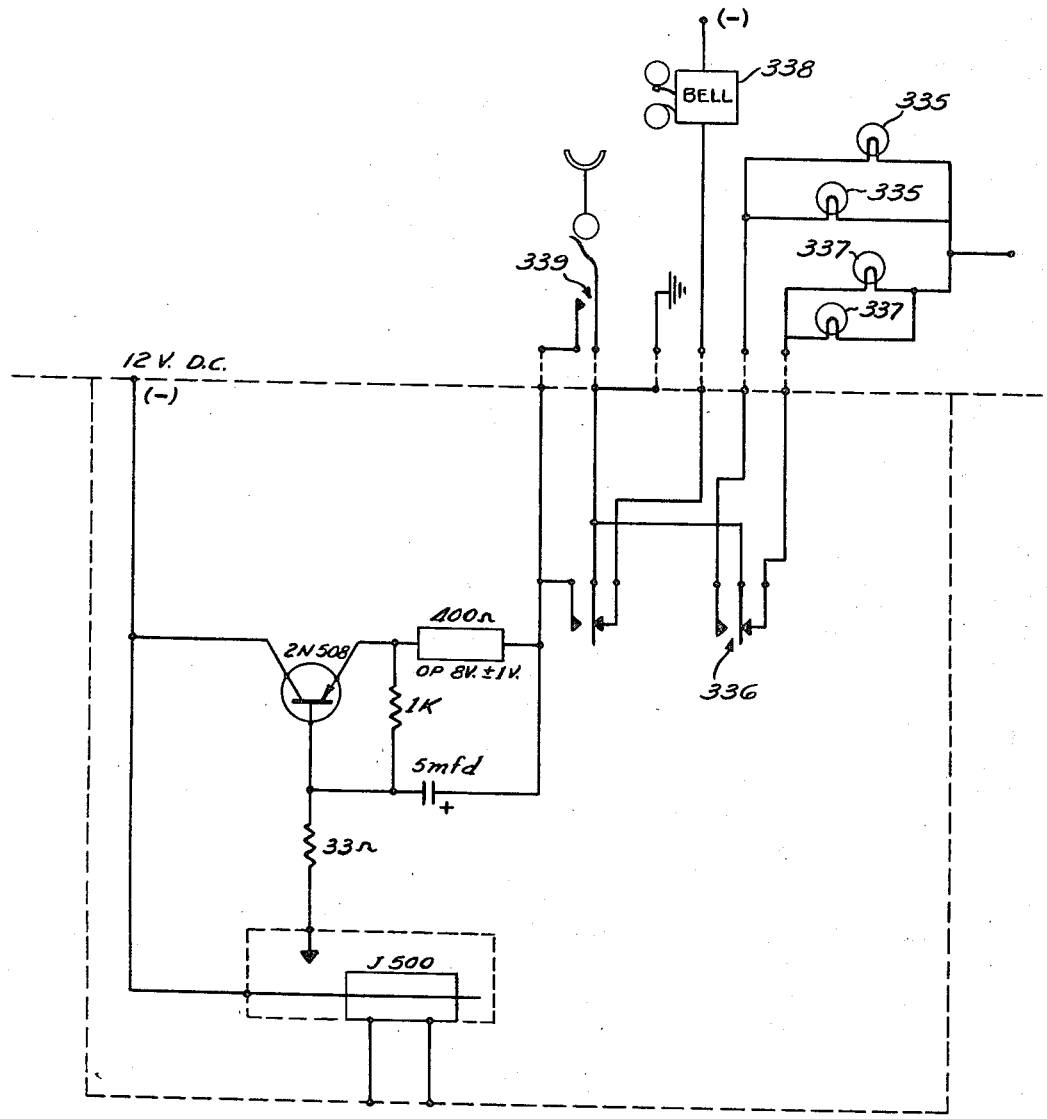
FIGURE 11 is a schematic circuit diagram of one of the alarm signal detectors at the alarm central station in this second system.

Details of each decoder module, which is conventional, are shown in FIG. 11 which also shows the wiring of the alarm systems incorporated. Each decoder includes a pair of green showing lamps 335 each of which is parallel one with the other and is connected to the output of the decoder through contacts 336 and are normally lit so long as the tone is present from the corresponding encoder.

However, if this alarm tone disappears, the contacts 336 are reversed, thus bringing into circuit a pair of red showing lamps 337 also in parallel one with the other. At the same time an audible signal, such as bell 338, is energized. It will therefore be appreciated that the store manager or the like at the customer's premises 312 (FIG. 13) can immediately identify the type of alarm and can then trace down the particular sensing element 333 which caused the alarm. He may operate a series of push buttons which are in parallel with the sensing element contacts and discover which function has failed. However, these push buttons in parallel with individual sensing elements have not been illustrated as the circuitry involved is conventional.

The push buttons, however, are necessary as many of the function failures may not be apparent immediately.

In FIG. 11 it will also be observed that a push button switch 339 is illustrated. This is necessary when the device is switched on in order to set the decoders to receive the relevant frequency of the encoder and to activate the necessary relays within the decoders.

A further output from the line amplifier 334 at the customer's premises (FIG. 13) is provided through a transformer 340 to a pair of resistors 341 which divide the output current to the two sides of the center taps 342 of the primary of the input transformer 328. The current carrying the combined encoder frequencies is a so-called "transverse" current which flows through the two wires 319 of the telephone line, being equal upon either side thereof, and with ground providing the return for each, and thus does not interfere with the function of the telephone line insofar as audio program signals are concerned. The resistors 341 are in circuit to supply a relatively high resistance from each wire of the telephone line to ground, thus enabling the line failure circuit to detect leakages to ground in the vicinity of unit 312.

These alarm tone currents enter the output transformer 318 at the alarm central station (FIG. 9) and pass out of center taps 343, around a two coil relay unit 344 through bypass condensers 344' to a further transformer 345 within the alarm central station 310. One side of transformer 345 is connected through potentiometer 346 to a D.C. source 347 and thence to ground.

The input from transformer 345 passes through a 60 cycle rejection filter 346' to a line amplifier 347' and thence to the remotely situated decoder modules 330'', 331'' and 332'', which operate as hereinbefore described.

The 60 cycle rejection filter 346' is important inasmuch as it eliminates the relatively high hum levels that occur between a telephone line and ground. It will be appreciated that normally, relatively low levels of hum are present between the two sides of the line where the signal is normally passing, but from the line itself, because it is normally above ground, extraneous voltages may occur, running as high as 35 volts. Inasmuch as we are dealing with tone voltages of less than a volt, it is necessary to get rid of this 60 cycle hum at this point to prevent any interference with the operation of the decoders.

Summarizing the foregoing, the encoder module generates an alarm signal tone at a fixed frequency which passes through a plurality of sensing elements in series located at strategic positions and thence through a line amplifier to a corresponding tone decoder module situated within the customer's premises and tuned to the exact frequency of the corresponding encoder module.

Also the alarm signal tone is transmitted back to the alarm central station 310 through the same telephone line which carries the music program signals and is connected to a further decoder module within the alarm central station, which is also tuned to the precise frequency of the corresponding encoder module.

So long as the alarm tone from the encoder is present within the corresponding decoder, the lights show green, thus indicating that the system is operating satisfactorily. However, if any one of the sensing elements opens due to malfunction or interference or the like, the alarm tone disappears and, even although this disappearance is momentary, the contacts within the decoder operate, thus switching the lights from green to red and connecting the audible warning in circuit.

If this occurs while personnel are present at the customer's premises, the particular sensing unit 333 which has been opened can be ascertained by the aforementioned push button in parallel with each of the sensing elements.

However, if it occurs while the customer's premises are vacant, the supervisor at the alarm central station can immediately take the necessary action, depending upon which decoder has been operated.

Due to the fact that the telephone lines connecting the various customers' units 312 to the alarm central station are above ground and are subject to failure, it is necessary to have some indication of the failure of these lines and this is supplied by means of the two coil relay unit 344 hereinabove described.

The two equal portions of the D.C. supervisory current passing through the respective wires 319 of the telephone line each pass through one of the relays in the two-coil relay unit 344 and are then joined to the main line feeding transformer 345. So long as the current flowing through each coil is similar, the relay contacts 349 will be open, as shown in FIG. 9.

However if there is a differential in the current flowing through each of the coils, then the relay will operate, thus connecting the power supply to the line failure warning device 350 (FIG. 9) which may be either visual or audible as desired.

By choosing the particular relay and adjusting the voltage by means of potentiometer 346, the relay can be designed to operate at plus or minus 3 milliamps on a 10 milliamp current, thus making it extremely sensitive to any possible failures or faults on the wires 319 of the two-wire telephone line.

Each relay in the two-coil relay unit 344 normally is not operated as it is connected so that the magnetic fields of both coils are equal and opposite, and therefore cancel. If a resistance occurs on either side of the telephone line to ground, it would unbalance the current in the two coils of this relay, thus causing same to operate.

Preferably, this two-coil relay unit is identical to the arrangement shown in FIG. 6 and already described in detail with reference to the system of FIGS. 1–8.

By using the split phase return of the alarm tone current along the two wires 319 of the telephone line, one wire 319 can be open and yet the alarm system will still operate although the line failure warning device will be activated. This is of extreme importance as it conforms with the Underwriter's requirements.

If a short circuit occurs between the two wires 319, the system still continues to operate but it does not indicate a line failure warning. However, a full short will cause loss of programming to the customers' premises 312 and will immediately become apparent to the operators.

Also, with the sensing elements and various components in the circuit of the alarm system, a failure of any component will cause the alarm to operate so that the failure can be traced, it being considered more desirable to have a false alarm due to component failure than no alarm and no method of ascertaining component failure.

The encoder devices or modules are extremely accurate and the transformer 345 can be tuned to the center of the frequencies used by the plurality of decoders. As an example, the three decoders can operate within a range of frequencies between 145 and 155 cycles per second. By tuning the transformer 311 to 150 cycles per second, the tone transmission circuit is made more efficient in this region of operation.

However, due to the frequencies used and the accuracy of the encoders and decoders, it has been found that in contrast to normal D.C. practices, there is no interference from stray electrical pickup or induced voltages such as normally create difficulties in telephone transmission lines particularly during storms, wind, rain and the like.

While the foregoing description and the accompanying drawings disclose two presently-preferred embodiments of the present invention, it is to be understood that this invention is susceptible of other embodiments differing from the particular arrangements shown without departing from the spirit and scope of this invention. For example, under certain circumstances the present alarm signaling system may use radio or microwave transmission of the alarm tones, instead of transmission over a private two-wire telephone line, in which case the line supervising circuit will not be necessary, of course. Also, the present alarm signaling system may use wire conductors other than a telephone line, if desired.

I claim:

1. A signaling system for transmitting an audio program from a central station to a remote station and for signaling an alarm from the remote station to the central station, said system comprising:

a private two-wire telephone line extending between the central station and the remote station;

an audio program source at the central station coupled to the telephone line thereat to transmit audio program signals along the telephone line to the remote station;

alarm signal generator means at the remote station for generating an A.C. alarm signal of a predetermined frequency below 2000 cycles per second, said alarm signal generator means being coupled to the telephone line at the remote station to transmit said alarm signal along the telephone line to the central station;

means for separating the alarm signal from the audio program signals at the central and remote stations;

receiver means at the remote station coupled to the telephone line thereat to broadcast the audio program signals coming in over the telephone line from the central station;

alarm signal receiver means at the central station coupled to the telephone line thereat to receive said alarm signal coming from the remote station, said alarm signal receiver means including indicator means operable in response to a predetermined condition of the alarm signal coming in over the telephone line to indicate an alarm condition at the remote station;

means at the central station for applying two separate line supervisory D.C. currents individually to the respective wires of the telephone line;

and means at the central station operable in response to an abnormality of either supervisory current to indicate a fault condition on the telephone line.

2. A signaling system for transmitting an audio program from a central station to a remote station and for signaling an alarm from the remote station to the central station, said system comprising:

a private two-wire telephone line extending between the central station and the remote station;

an audio program source at the central station coupled to the telephone line thereat to transmit audio program signals along the telephone line to the remote station;

alarm signal generator means at the remote station for generating an alarm signal of a predetermined frequency falling within the frequency range from 60 to 240 cycles per second and substantially separated from 60 cycles per second and harmonics thereof, said alarm signal generator means being operative to generate said alarm signal continuously in the absence of a predetermined alarm condition at the remote station, said alarm signal generator means being operative in response to said predetermined alarm condition at the remote station to stop generating said alarm signal, said alarm signal generator means at the remote station being coupled to the telephone line thereat to transmit said alarm signal along the telephone line to the central station simultaneously with the transmission over said line of the program signals from the central station to the remote station;

means at the remote station for separating the alarm signal from the audio program signals;

program receiver means at the remote station coupled to the telephone line thereat to broadcast the audio program signals coming in over the telephone line from the central station;

means at the central station for separating the audio program signals from the alarm signal;

alarm signal receiver means at the central station coupled to the telephone line thereat to receive said alarm signal coming in over the telephone line from the remote station, said receiver means including indicator means operable in response to the cessation of said alarm signal coming in over the telephone line to indicate said predetermined alarm condition at the remote station;

means at the central station for applying two separate D.C. supervisory currents individually to the respective wires of the two-wire line;

separate termination impedance means at the remote station terminating the respective wires of the telephone line to ground for D.C.;

and indicator means at the central station operable in response to an abnormality of either D.C. supervisory current to indicate a fault on the telephone line.

3. A signaling system for transmitting an audio program from a central station to a remote station and for signaling different alarms from the remote station to the central station, said system comprising:

a private two-wire telephone line extending between the central station and the remote station;

an audio program source at the central station coupled to the telephone line thereat to transmit audio program signals over the telephone line to the remote station;

a plurality of alarm tone generators at the remote station for generating alarm signals of different frequencies, each within a frequency range between 120 and 180 cycles per second and substantially separated from both 120 and 180 cycles per second, each of said alarm tone generators being operative to generate its respective alarm signal continuously in the absence of a respective predetermined alarm condition at the remote station, each of said alarm tone generators being operative in response to a respective predetermined alarm condition at the remote station to stop generating its respective alarm signal, each of said alarm tone generators being coupled to the telephone line at the remote station to transmit the respective alarm signal over the telephone line from the remote station to the central station simultaneously with the transmission over said line of program signals from the central station to the remote station;

means at the remote station separating the outgoing alarm signals from the incoming audio program signals;

program receiver means at the remote station coupled to the telephone line thereat to broadcast the audio program signals coming in over the telephone line from the central station;

means at the central station for separating the outgoing audio program signals from the incoming alarm signals;

alarm signal receiver means at the central station coupled to the telephone line thereat to receive said plurality of alarm signals coming in over the telephone line from the remote station, said receiver means including a plurality of alarm signal detectors for the different alarm signals, each of said detectors including indicator means energized in response to the reception of a respective alarm signal and indicator means energized in response to the cessation of a respective alarm signal coming in over the telephone line to indicate the respective predetermined alarm condition at the remote station;

means at the central station for applying two separate D.C. supervisory currents individually to the respective wires of the two-wire line;

separate terminating impedances at the remote station individually terminating the respective wires of the telephone line to ground for D.C.;

and indicator means at the central station operable in response to an abnormality of either D.C. supervisory current to indicate a fault on the telephone line.

4. A signaling system according to claim 3 wherein each of said alarm signal detectors at the central station comprises:

first and second lamps;

means for maintaining said first lamp on and for maintaining said second lamp off as long as the respective alarm signal is coming in over the telephone line, said last-mentioned means, in response to the cessation of said alarm signal, turning off the first lamp and turning on the second lamp;

and reset means operable selectively by an operator at the central station after the cessation of the respective alarm signal to turn said first lamp on again while said second lamp remains on until the respective alarm signal again is received over the telephone line.

5. An alarm signaling system for signaling an alarm from a customer's premises to an alarm central station, said system comprising:

a private two-wire telephone line extending between the customer's premises and the alarm central station;

an alarm tone generator at the customer's premises coupled to the line to apply a continuous alarm tone thereto in the absence of an alarm condition at the customer's premises, means responsive to an alarm condition at the customer's premises for stopping said alarm tone on the line;

means at the alarm central station coupled to the line and responsive to the stopping of said alarm tone thereon to signal the occurrence of an alarm condition at the customer's premises;

a first direct current source at the alarm central station coupled to one wire of the line for applying a first D.C. supervisory current thereto;

first terminating impedance means at the customer's premises terminating said one wire of the line to ground for D.C.;

a second direct current source at the alarm central station coupled to the other wire of the line for applying a second D.C. supervisory current thereto;

second terminating impedance means at the customer's premises terminating said other wire of the line to ground for D.C.;

and means at the alarm central station operable in response to an abnormal supervisory current to either wire to indicate a line fault.

6. An alarm signaling system for signaling an alarm from a remote station to a central station, said system comprising:

a private two-wire telephone line extending between the remote station and the central station;

a plurality of alarm tone generators at the remote station generating continuous alarm tones of separate and distinct frequencies, each said alarm tone having a fixed frequency within the range from 120 to 180 cycles per second and substantially separated from both 120 and 180 cycles per second, means for applying each alarm tone to the line in the absence of an alarm condition corresponding to that tone, means responsive to a predetermined alarm condition at the remote station for stopping the respective alarm tone on the line;

a plurality of alarm tone detectors coupled to the line at the central station and tuned respectively to the distinct frequencies of said alarm tones, signaling means operated by said detectors in response to the stopping of the respective alarm tones;

and means for applying a separate D.C. supervisory current to each wire of the line and operable in response to an abnormal condition of either of said supervisory currents to indicate a fault on the respective wire of the line.

7. An alarm signaling system for signaling an alarm from a customer's premises to an alarm central station, said system comprising:

a two-wire telephone line extending between the customer's premises and the alarm central station;

a plurality of alarm tone generators at the customer's premises generating continuous alarm tones of separate and distinct frequencies, each said alarm tone having a fixed frequency within the range from 120 to 180 cycles per second and substantially different from both 120 and 180 cycles per second, means for applying each alarm tone to the line in the absence of an alarm condition corresponding to that tone, means responsive to an alarm condition at the customer's premises for stopping the respective alarm tone generator;

a plurality of alarm tone detectors coupled to the line at the alarm central station and tuned respectively to the distinct frequencies of said alarm tones, signaling means operated by said detector in response to the stopping of the respective alarm tones;

a first direct current source at the alarm central station, a first two-coil relay having first and second windings and relay contact means operable by said windings jointly, circuit means at the alarm central station connecting said first winding of the first relay across said first current source to be energized thereby, circuit means at the alarm central station connecting the second winding of the first relay between said first current source and one wire of the telephone line thereat, terminating means at the customer's premises terminating said one wire of the telephone line to ground for D.C., said windings of the first relay producing opposing fluxes which cancel one another in the absence of a fault on said one wire of the telephone line;

a second direct current source at the alarm central station, a second two-coil relay having first and second windings and relay contact means operable by said windings jointly, circuit means at the alarm central station connecting said first winding of the second relay across said second current source to be energized thereby, circuit means at the alarm central station connecting said second winding of the second relay between said second current source and the other wire of the telephone line thereat, terminating means at the customer's premises terminating said other wire of the telephone line to ground for D.C., said windings of the second relay producing opposite fluxes which cancel each other in the absence of a fault on said other wire of the telephone line;

the second winding of each relay producing a flux unbalance therein to operate the contact means of said relay due to abnormal current through said last-mentioned second winding when a fault occurs on the respective wire of the telephone line;

and indicator means at the alarm central station operable by said relays to indicate a fault on the telephone line.

8. An alarm signaling system for signaling an alarm from a remote station to a central station, said system comprising:

a private two-wire telephone line extending between the remote station and the central station;

an alarm tone generator at the remote station coupled to one end of said line to apply a continuous low audio frequency alarm tone thereto in the absence of a predetermined alarm condition at the remote station, means responsive to said predetermined alarm condition at the remote station for stopping said alarm tone on the line;

alarm tone receiver means at the central station coupled to the line and responsive to the stopping of said alarm tone thereon to signal the occurrence of said predetermined alarm condition at the remote station;

and means at the central station for applying a separate supervisory current to each wire of the line and operable in response to an abnormal condition of either of said supervisory currents to indicate a fault on the respective wire of the line;

said alarm tone receiver means including an amplifier having a reserve gain sufficient to maintain the alarm tone coming in over the telephone line at a predetermined amplitude level despite the occurrence of a ground or open-circuit condition on either wire of the telephone line.

9. A line fault supervision arrangement in a signaling system comprising:

a two-wire telephone line;

a first direct current source at one end of the line for applying a first D.C. supervisory current to one wire of the line;

first resistance means at the opposite end of said line terminating said one wire to ground for D.C.;

a second direct current source at said one end of the line for applying a second D.C. supervisory current to the other wire of said line;

second resistance means at the opposite end of said line terminating said other wire to ground for D.C.;

and means at said one end of the line operable in response to an abnormal supervisory current in either wire to indicate a fault on the line.

10. A line fault supervision arrangement in a signaling system comprising:

a two-wire telephone line;

a first direct current source at one end of the line, a first two-coil relay having first and second windings and relay contact means operable by said windings jointly, circuit means at said end of the line connecting said first winding of the first relay across said first current source to be energized thereby, circuit means at said end of the line connecting the second winding of the first relay between said first current source and one wire of the telephone line thereat, terminating means at the opposite end of the line terminating said one wire of the telephone line to ground for D.C., said windings of the first relay producing opposite fluxes which cancel one another in the absence of a fault on said one wire of the telephone line;

a second direct current source at said one end of the line, a second two-coil relay having first and second windings and relay contact means operable by said windings jointly, circuit means at said one end of the line connecting said first winding of the second relay across said second current source to be energized thereby, circuit means at said one end of the line connecting said second winding of the second relay between said second current source and the other wire of the telephone line thereat, terminating means at said opposite end of the line terminating said other wire of the telephone line to ground for D.C., said windings of the second relay producing opposite fluxes which cancel each other in the absence of a fault on said other wire of the telephone line;

the second winding of each relay producing a flux unbalance therein to operate the contact means of that relay due to abnormal current through said last-mentioned second winding when a fault occurs on the respective wire of the telephone line;

and indicator means at the alarm central station operable by said relays to indicate a fault on the telephone line.

11. In an alarm signaling system for signaling an alarm from a customer's premises to an alarm central station, the improvement which comprises an alarm indicating arrangement at the alarm central station including:

first and second visual indicator devices;

means for maintaining said first indicator device in its operated condition and for maintaining said second indicator device in its unoperated condition in the absence of a predetermined alarm condition at the customer's premises; said last-mentioned means, in response to said predetermined alarm condition, changing said second indicator device to its operated condition and changing said first indicator device to its unoperated condition;

and selectively operable reset means for restoring said first indicator device to its operated condition while said second indicator device remains in its operated condition until said predetermined alarm condition ceases.

12. In an alarm signaling system for signaling an alarm from a customer's premises to an alarm central station, the improvement which comprises an alarm indicating arrangement at the alarm central station including:

first and second indicator devices;

energization circuits for said indicator devices;

control means for said energization circuits operable
 (a) in the absence of a predetermined alarm condition at the customer's premises, to maintain said first indicator device energized and said second indicator device de-energized, and
 (b) in response to said alarm condition, to energize said second indicator device and de-energize said first indicator device;

and reset means connected in one of said energization circuits and selectively operable by an operator at the alarm central station after said alarm condition has occurred to re-energize said first indicator device while said second indicator device remains energized until said alarm condition ceases.

13. In an alarm signaling system for signaling an alarm from a customer's premises to an alarm central station, the improvement which comprises an alarm indicating arrangement at the alarm central station including:
  first and second distinctively colored lamps;
  an alarm relay having a first set of contacts connected to said lamps;
  a reset relay having a normally-open second set of contacts connected to said first lamp;
  a normally-open reset switch controlling the energization of said reset relay and normally maintaining the latter de-energized to maintain said second set of contacts open;
  and energizing means operable in the absence of a predetermined alarm condition at the customer's premises for maintaining said alarm relay energized to complete an energization circuit for said first lamp through said first set of contacts and to maintain said second lamp de-energized, said last-mentioned means being operable in response to said predetermined alarm condition to de-energize said alarm relay so as to de-energize said first lamp and complete an energization circuit for said second lamp through said first set of contacts;
  said reset switch, when closed after said alarm relay has been de-energized, completing an energization circuit for said reset relay;
  said reset relay, when energized by the closing of said reset switch, completing an energization circuit for said first lamp through said second set of contacts to maintain the first lamp energized, along with the second lamp, as long as said predetermined alarm condition continues;
  said energizing means, when said predetermined alarm condition ceases, restoring said alarm relay to its energized condition to turn off said second lamp and complete said energization circuit for said first lamp through said first set of contacts.

14. A signaling system for signaling different alarms from a remote station to a central station, said system comprising:
  a plurality of alarm signal generators at the remote station for generating distinctive alarm signals continuously in the absence of a respective predetermined alarm condition at the remote station, and means operative in response to a respective predetermined alarm condition at the remote station for causing the respective alarm signal generator to stop generating its respective alarm signal;
  alarm signal receiver means at the central station including a plurality of alarm signal detectors for the different incoming alarm signals, each of said detectors comprising first and second lamps, means for maintaining the first lamp on and the second lamp off as long as the respective alarm signal is being received, said last-mentioned means turning off the first lamp and turning on the second lamp in response to the stopping of the respective incoming alarm signal, and reset means operable selectively by an operator at the central station after the stopping of the respective incoming alarm signal to turn said first lamp on again while said second lamp remains on until the respective alarm signal is again received.

15. A signaling system for signaling different alarms from a remote station to a central station, said system comprising:
  a plurality of alarm signal generators at the remote station for generating distinctive alarm signals continuously in the absence of a respective predetermined alarm condition at the remote station, and means operative in response to a respective predetermined alarm condition at the remote station for causing the respective alarm signal generator to stop generating its respective alarm signals;
  alarm signal receiver means at the central station including a plurality of alarm signal detectors for the different incoming alarm signals, each of said detectors comprising
  first and second distinctively colored lamps,
  an alarm relay having a first set of contacts connected to said lamps,
  a reset relay having a normally-open second set of contacts connected to said first lamp,
  a normally-open reset switch controlling the energization of said reset relay and normally maintaining the latter de-energized to maintain said second set of contacts open,
  and energizing means operable in the absence of a predetermined alarm condition at the customer's premises for maintaining said alarm relay energized to complete an energization circuit for said first lamp through said first set of contacts and to maintain said second lamp de-energized, said last-mentioned means being operable in response to said predetermined alarm condition to de-energize said alarm relay so as to de-energize said first lamp and complete an energization circuit for said second lamp through said first set of contacts,
  said reset switch, when closed after said alarm relay has been de-energized, completing an energization circuit for said reset relay,
  said reset relay, when energized by the closing of said reset switch, completing an energization circuit for said first lamp through said second set of contacts to maintain the first lamp energized, along with the second lamp, as long as said predetermined alarm condition continues,
  said energizing means, when said predetermined alarm condition ceases, restoring said alarm relay to its energized condition to turn off said second lamp and complete said energization circuit for said first lamp through said first set of contacts.

16. An alarm signaling system for signaling an alarm from a remote station to a central station, said system comprising:
  a two-wire telephone line extending between the remote station and the central station;
  an alarm tone generator at the remote station operable to apply an alarm tone to the line in the absence of an alarm condition at the remote station, means responsive to an alarm condition at the remote station for stopping said alarm tone on the line;
  a receiver at the central station coupled to the line to receive the said alarm tone thereon;
  line-fault monitoring means at the central station for detecting and indicating a fault on either wire of said two-wire telephone line;
  and said receiver and said line fault monitoring means having separate signaling means operable together to indicate a fault on both wires of the telephone line.

17. An alarm signaling system for signaling an alarm from a remote station to a central station, said system comprising:
  a private two-wire telephone line extending between the remote station and the central station;
  a plurality of alarm tone generators at the remote station generating continuous alarm tones of separate and distinct frequencies, means for applying each alarm tone to the line in the absence of an alarm condition corresponding to that tone, means responsive to a predetermined alarm condition at the remote station for stopping the respective alarm tone on the line;
  a plurality of alarm tone detectors coupled to the line at the central station and tuned respectively to the distinct frequencies of said alarm tones, signaling means operated by said detectors in response to the stopping of the respective alarm tones;
  and line fault monitoring means at the central station for detecting and indicating a fault on either wire of the telephone line;

said line fault monitoring means and said signaling means operated by the alarm tone detectors all being operable in response to either an open-circuit on both wires of the telephone line or a short-circuit between said wires to indicate an attack on the telephone line.

References Cited

UNITED STATES PATENTS

| | | | |
|---|---|---|---|
| 2,357,925 | 9/1944 | Appel | 317—147 X |
| 3,129,394 | 4/1964 | Long | 179—2.5 X |
| 2,249,891 | 7/1941 | Ekman et al. | 340—213 |
| 2,987,712 | 6/1961 | Polyzou | 340—213 |
| 3,069,673 | 12/1962 | Ward | 179—5 |
| 3,112,475 | 11/1963 | Alessio | 340—326 X |
| 3,161,731 | 12/1964 | Seeley | 340—213 |
| 2,696,524 | 12/1954 | Huntington et al. | 179—5 |
| 3,069,673 | 12/1962 | Ward et al. | 179—5 |
| 3,013,257 | 12/1961 | Ippolito | 340—249 |
| 3,040,182 | 6/1962 | Lapuyade | 307—66 |
| 2,082,143 | 6/1937 | Bossart | 340—253 |
| 3,133,275 | 5/1964 | Cohrt et al. | 340—253 |

OTHER REFERENCES

Knowlton: A. E. Standard Handbook for Electrical Engineers, 9th Ed., McGraw Hill, N.Y., 1957, TK 151 582 (p. 1966 relied on).

ROBERT L. GRIFFIN, *Primary Examiner.*

J. T. STRATMAN, *Assistant Examiner.*